United States Patent [19]
Nagasaki et al.

[11] Patent Number: 5,416,557
[45] Date of Patent: May 16, 1995

[54] CAMERA APPARATUS HAVING DRIFT DETECTING UNIT

[75] Inventors: Tatsuo Nagasaki, Yokohama; Yasuhiro Komiya, Hachioji, both of Japan

[73] Assignee: Olympus Optical Co., Ltd., Tokyo, Japan

[21] Appl. No.: 208,051

[22] Filed: Mar. 8, 1994

Related U.S. Application Data

[63] Continuation of Ser. No. 800,761, Dec. 2, 1991, abandoned, which is a continuation of Ser. No. 631,359, Dec. 20, 1990, abandoned.

[30] Foreign Application Priority Data

| Dec. 28, 1989 | [JP] | Japan | 1-343614 |
| Dec. 28, 1989 | [JP] | Japan | 1-343615 |
| Jan. 31, 1990 | [JP] | Japan | 2-18928 |

[51] Int. Cl.$^6$ .................................. G03B 5/00
[52] U.S. Cl. ............................................ 354/430
[58] Field of Search ............. 354/430, 65, 70; 250/203.1, 203.3, 203.7; 348/208; 359/554, 555, 556, 557

[56] References Cited
U.S. PATENT DOCUMENTS

| 3,825,748 | 7/1974 | Van Wandelen | 354/430 |
| 4,218,119 | 8/1980 | Schickedanz | 354/430 |
| 4,492,452 | 1/1985 | Suzuki et al. | 354/430 |
| 4,615,590 | 10/1986 | Alvarez et al. | 350/500 |
| 4,623,930 | 11/1986 | Oshima et al. | 358/220 |
| 4,673,276 | 6/1987 | Yoshida et al. | 354/430 |
| 4,780,739 | 10/1988 | Kawakami et al. | 354/430 |

FOREIGN PATENT DOCUMENTS

0149365 7/1975 European Pat. Off.

OTHER PUBLICATIONS

"Intelligent digital image stabilizer", K. Uomori et al, pp. 177–180.
"Video Movement Stabilizer", K. Kawamura et al, pp. 377–378.

*Primary Examiner*—W. B. Perkey
*Attorney, Agent, or Firm*—Frishauf, Holtz, Goodman & Woodward

[57] ABSTRACT

A solid-state imaging device electronically images at least a portion of an image of a subject formed on a film exposure surface through a potographic optical lens. This imaging device is driven at a high speed by an imaging device driver to repeatedly perform electronic imaging of the subject image. A frame memory stores a subject image signal initially imaged by the imaging device. A two-dimensional correlating circuit executes a two-dimensional correlation arithmetic operation between the subject image signal stored in the frame memory and subject image signals sequentially imaged during a film exposure period for the subject image, thereby calculating drift between the subject images formed on the film exposure surface in the x and y directions perpendicular to an optical axis of the lens. An actuator driver drives an actuator in accordance with the detected drift in the x and y directions to move lens in the x and y directions, thereby correcting the drifts.

19 Claims, 15 Drawing Sheets

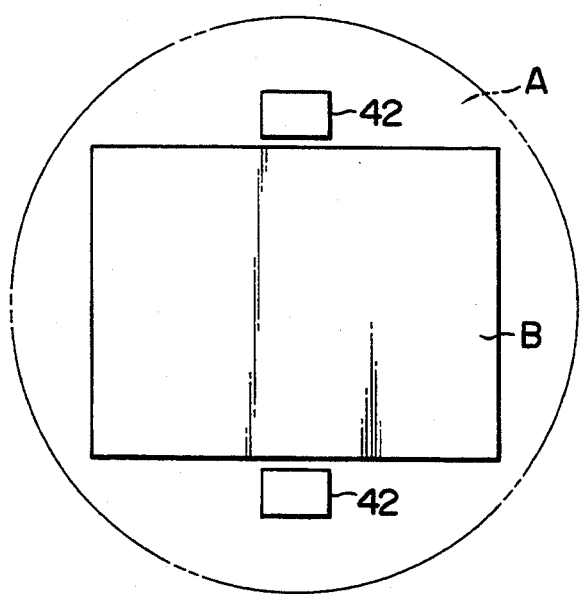
F I G. 5
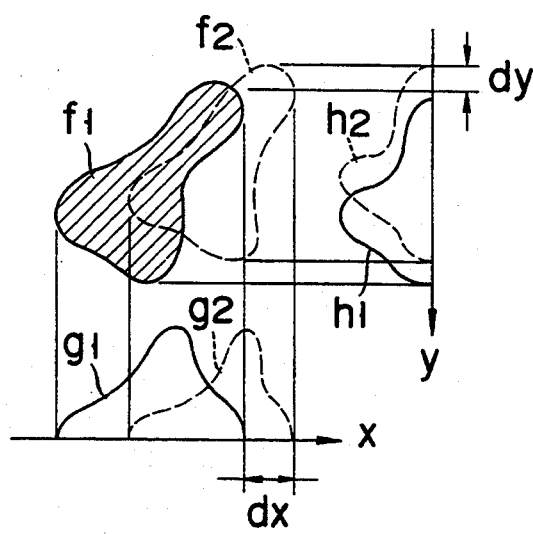
F I G. 8
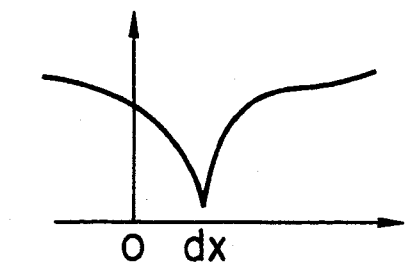
F I G. 9A
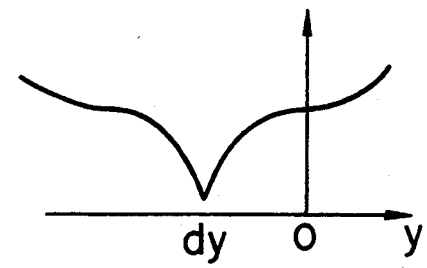
F I G. 9B

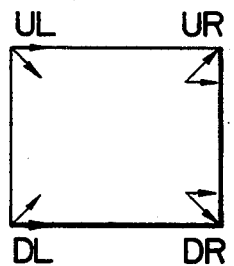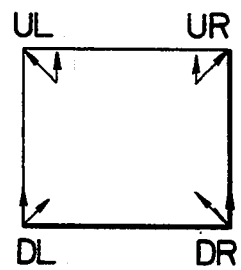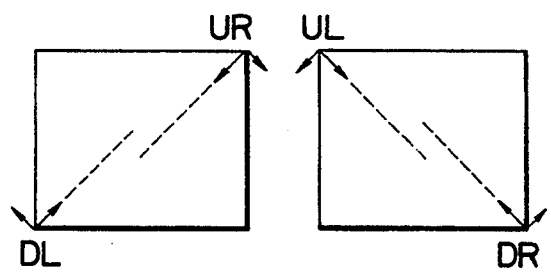
FIG. 21A  FIG. 21B  FIG. 21C  FIG. 21D
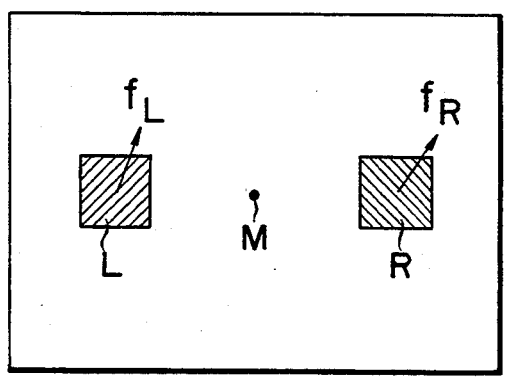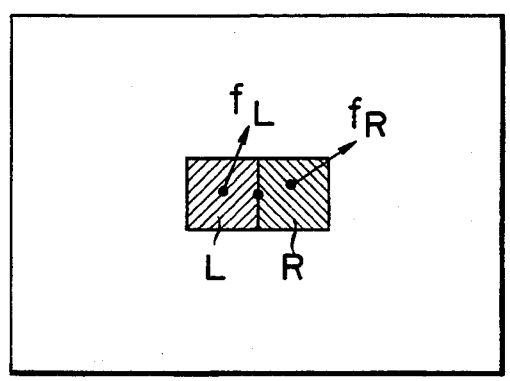
FIG. 23A  FIG. 23B

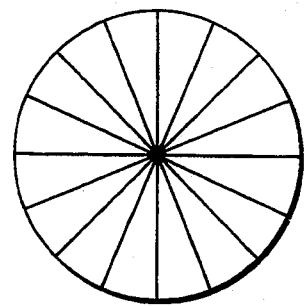
F I G. 25
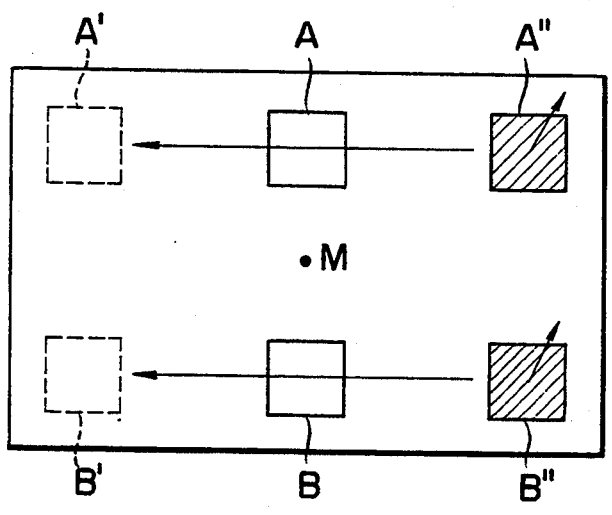
F I G. 27
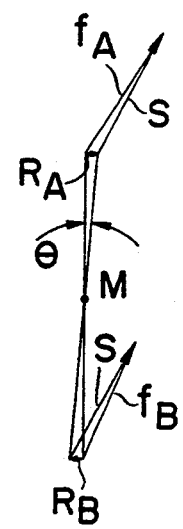
F I G. 28

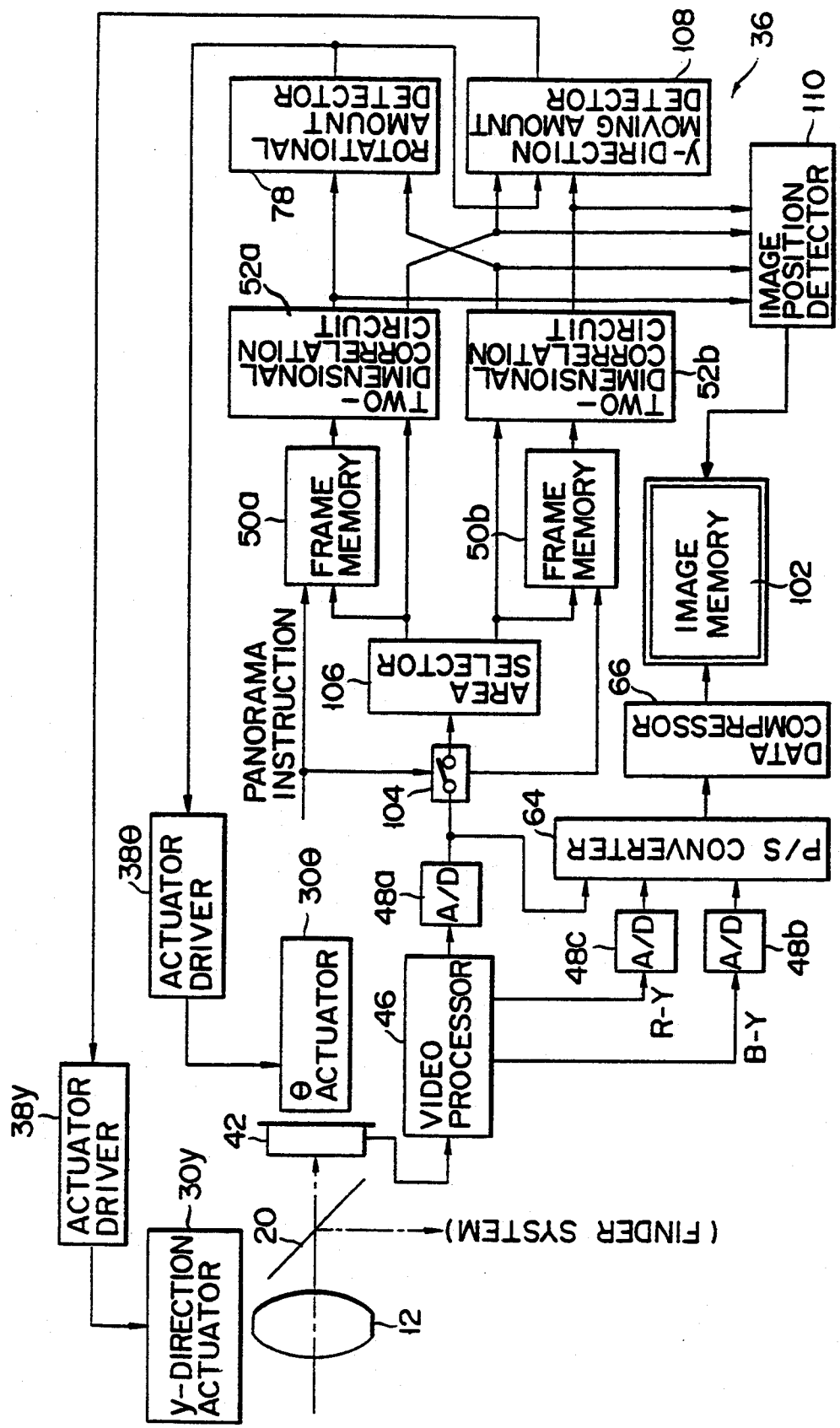
F I G. 26

CAMERA APPARATUS HAVING DRIFT DETECTING UNIT

This is a continuation of application Ser. No. 07/800,761 filed Dec. 2, 1991, now abandoned, which is a continuation of application Ser. No. 07/631,359 filed Dec. 20, 1990, now abandoned.

BACKGROUND OF THE INVENTION

1. Field of the Invention

This invention relates to a camera apparatus such as a camera for guiding an image of a subject or a to-be-photographed object onto a film exposure surface and recording the object on the film or an electronic camera for guiding an image of a subject onto an imaging surface of an imaging device and recording the object in a recording medium and, in particular, to a camera apparatus having a drift or displacement detecting unit for detecting a difference (or displacement) between images of a subject on an image formation surface and using the detection result.

The detection result of the above drift or displacement detecting unit is used to, e.g., prevent adverse influence of unintentional movement of the hands in taking a picture or perform panorama photography by using the camera apparatus. Throughout the following description the term "drift or displacement" is shortened to "drift" for ease of explanation. It is understood that "drift" is used as an alternate to "displacement" throughout the following description.

2. Description of the Related Art

When film exposure is to be performed for an image of a subject by using a camera apparatus, i.e., when photography is to be performed by using a camera, a drift or a difference between the subject images to be formed on a film surface, i.e., unintentional movement of the hands (so-called camera shake) is a problem. Especially in long-time exposure or in telephoto or macro photography, camera shake is a serious problem.

Conventionally, in order to prevent such camera shake to perform photography with high contrast (resolution), a camera is fixed on a tripod or an auxiliary light source such as a stroboscopic lamp is used to perform exposure for a short time period so that the problem of camera shake is negligible. The use of such an auxiliary means is generally very cumbersome, however, and the ease in handling or carrying of a camera is significantly degraded.

Such disadvantages are problematic in also an electronic camera for electrically recording an image of a subject by using a solid-state imaging element.

SUMMARY OF THE INVENTION

The present invention has been made in consideration of the above situation and has as its object to provide a camera apparatus capable of correcting a drift over a time between images of a subject in exposure of the image, thereby effectively correcting so-called camera shake.

A camera apparatus according to the present invention comprises a photographic optical lens for forming a subject image of a subject on an image formation surface; imaging device means for electronically imaging at least a portion of the subject image formed on the image formation surface; imaging device driving means for driving the imaging device means at a high speed to repeatedly perform electronic imaging of the subject image; drift detecting means for calculating a correlation between subject images repeatedly read out at a high speed from the imaging device means to detect a drift between the subject images formed on the image formation surface; and drift correcting means for displacing an optical positional relationship between said photographic optical lens and the image formation surface with respect to the subject in accordance with the drift detected by the drift detecting means, thereby correcting the drift between the subject images formed on the image formation surface.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 5 is a view showing a relationship between a photographing range on a film exposure surface and a mount position of a solid-state imaging device in the second embodiment;

FIG. 8 is a view showing an image signal obtained by the solid-state imaging device;

FIGS. 9A and 9B are graphs each for explaining a drift obtained by signal correlation;

FIGS. 21A to 21D are schematic views showing the manner of displacement of the inner housing member;

FIGS. 23A and 23B are views each showing a relationship between partial image regions for drift detection according to the ninth embodiment.

FIG. 25 is a view showing an arrangement of a solid-state imaging element used in a rotational angle detecting arithmetic operation.

FIG. 26 is a block diagram showing an arrangement of an electronic still camera as a camera apparatus according to the eleventh embodiment of the present invention;

FIG. 27 is a view for explaining image drift detection performed by panning; and FIG. 28 is a view for explaining an image drift detection principle.

DETAILED DESCRIPTION OF THE PREFERRED EMBODIMENTS

Embodiments of a camera apparatus according to the present invention will be described below with reference to the accompanying drawings.

Figure 1:
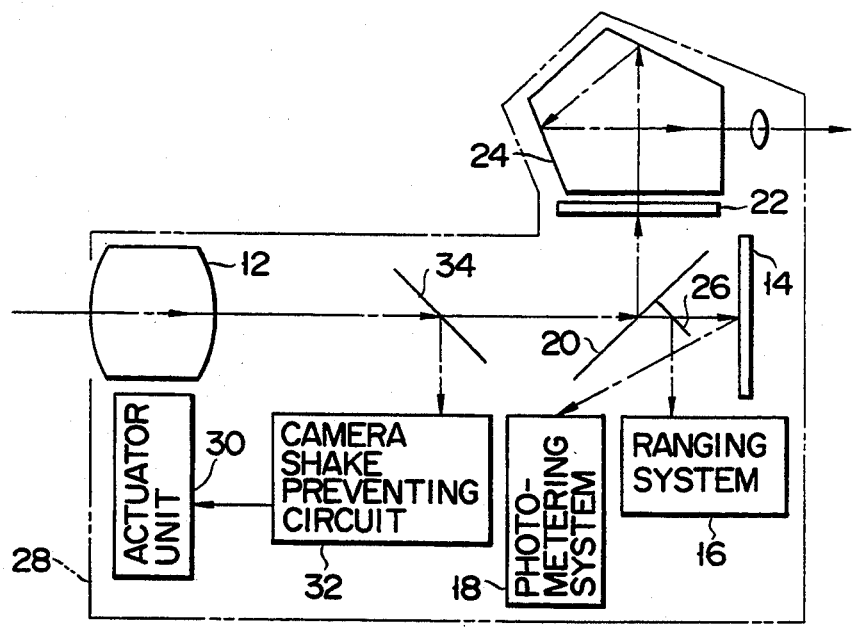
FIG. 1 is a block diagram showing an arrangement of a single-lens reflex camera as a camera apparatus according to the first embodiment of the present invention.

FIG. 1 shows the first embodiment in which the present invention is applied to a single-lens reflex camera. Referring to FIG. 1, a photographic optical lens 12 forms an image of a subject or a to-be-photographed object on a film exposure surface 14 and exposes the subject image on a film placed on the film exposure surface 14. In order to form an image of a subject on the film exposure surface 14, the photographic optical lens 12 is focusing-driven by a ranging system 16. An aperture mechanism (not shown) incorporated in the photographic optical lens 12 and a shutter mechanism (not shown) are driven to maintain a constant exposure amount of the subject image on the film exposure surface 14 under the control of a photometering system 18.

A main mirror 20 arranged before the film exposure surface 14 guides the image of the subject guided through the photographic optical lens 12 to a view finder system through a focusing screen 22 and a pentaprism 24. When the subject image is to be exposed onto the film, the main mirror 20 is moved outside an optical light path.

A portion of the image of the subject is input to the ranging system 16 via a submirror 26 incorporated in the main mirror 20. The ranging system 16 performs focusing determination on the basis of, e.g., phase difference detection between the subject images and performs focusing control with respect to the photographic optical lens 12. The photometering system 18 directly photometers a light amount of the subject reflected by the film exposure surface 14 and controls the film exposure amount described above. The ranging system 16 and the photometering system 18 can be realized by arbitrarily using various types of conventional methods and their functions are not directly concerned with the scope of the present invention. Therefore, a detailed description of the systems will be omitted.

A characteristic feature of the apparatus (camera apparatus) of this embodiment is that the photographic optical lens 12 is supported with respect to a main body 28 of the apparatus via an actuator unit 30 so as to be movable in a plane perpendicular to the optical axis of the lens, and the actuator unit 30 is driven by a camera shake preventing circuit 32 to move the photographic optical lens 12, thereby displacing an optical positional relationship between the photographic optical lens 12 and the film exposure surface 14 with respect to a subject. The camera shake preventing circuit 32 detects a portion of an image of a subject formed on the film exposure surface 14 through the photographic optical lens 12 via a half mirror 34 to detect a difference between the subject images formed on the film exposure surface 14 and drives the actuator unit 30. More specifically, the camera shake preventing circuit 32 is arranged as shown in FIG. 2.

Figure 2:
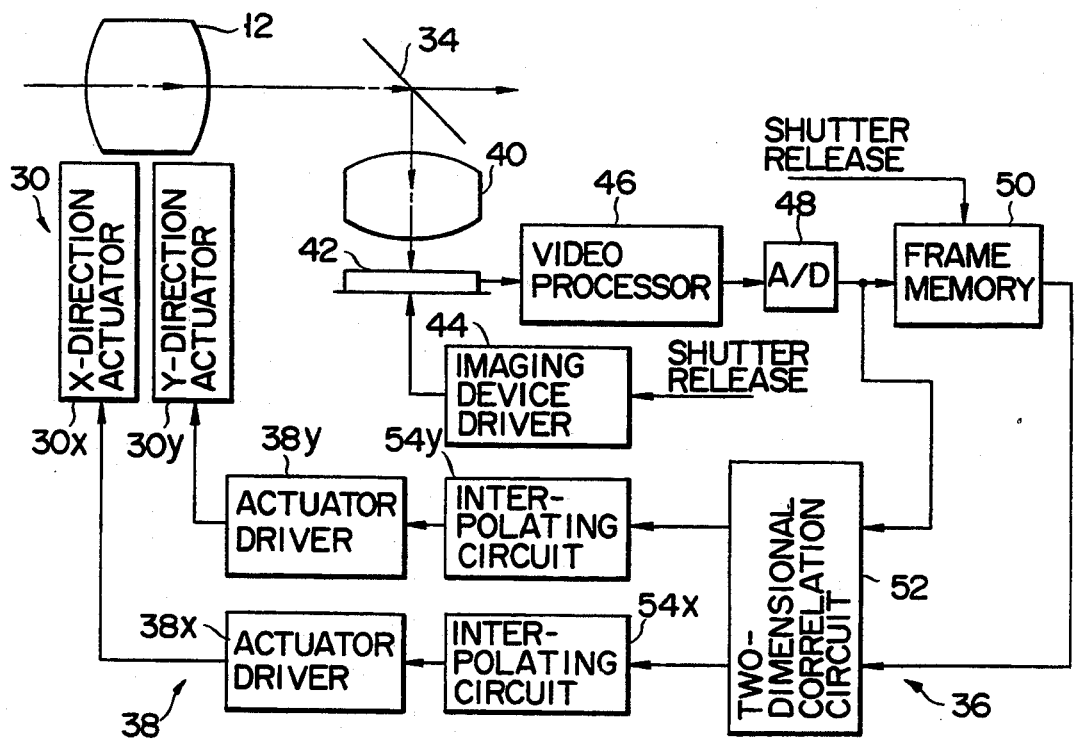
FIG. 2 is a block diagram showing an arrangement of a camera shake preventing circuit and its peripheral circuits in the camera according to the first embodiment.

Referring to FIG. 2, the camera shake preventing circuit 32 is constituted by a drift detecting unit 36 for detecting a difference between images of a subject on an image formation surface and an actuator driving unit 38 for driving the actuator unit 30 in accordance with an output from the detecting unit 36. In the detecting unit 36, a portion of the subject image guided via the half mirror 34 is enlarged through an enlarging optical lens 40 which operates, as is well known, by elongating the focal length, and imaged on an imaging surface of a solid-state imaging device 42 having a high sensitivity and a high operation speed. This solid-state imaging device 42 is constituted by an AMI (amplifying MOS imager) and has functions of exposing an image of a subject within a time period shorter than an exposure time of the subject image by using the film and reading out an imaging signal at a high speed. An imaging device driver 44 drives the solid-state imaging device 42 at a high speed within a film exposure period of the subject image in synchronism with a shutter release operation, thereby repeatedly reading out the subject image.

The subject image signal repeatedly read out at a high speed by the solid-state imaging device 42 is processed by a video processor 46 and sequentially digital-coded and fetched via an A/D converter 48. A frame memory 50 stores a first frame of the subject image signal fetched as described above in synchronism with the shutter release operation described above as a reference image signal for use in drift detection with respect to subject image signals fetched from the second frame.

A two-dimensional correlation circuit 52 executes a two-dimensional correlation arithmetic operation between a subject image signal of the first frame stored in the frame memory 50 and those fetched from the second frame, thereby detecting differences between the image signals (frame images) as x and y displacements. This two-dimensional correlation arithmetic operation is performed by arbitrarily using various types of conventional arithmetic algorithms. That is, basically, projection components in the x and y directions of two frame images are respectively compared with each other, and a difference or drift is calculated as a displacement in each direction.

A two-dimensional correlation circuit 52 executes a two-dimensional correlation arithmetic operation between the subject image signal of the first frame stored in the frame memory 50 and each subject image signal fetched from the second frame and detects a difference between the image signals (frame images) as x and y displacements. This two-dimensional correlation arithmetic operation is performed by arbitrarily using various types of conventional arithmetic algorithms. That is, basically, projection components in x and y directions of two frame images f1 and f2 having a drift or difference with respect to time as shown in FIG. 8 are respectively compared with each other, and the difference is obtained as displacements in the two directions, thereby executing the two-dimensional correlation arithmetic operation.

More specifically, assuming that an image of a subject f1 is formed on the solid-state imaging device 42 as shown in FIG. 8, projection components are obtained by projecting the image signal in the y and x directions as indicated by g1 an h1, respectively. If the subject image moves as indicated by f2 as time passes, projection components g2 and h2 are obtained for the image f2. That is, if the image f1 moves in the x and y directions as indicated by f2, the projection components of the image also move from g1 and h1 to g2 and h2 in the x and y directions, respectively.

The two-dimensional correlation circuit 52 calculates a correlation between the projection components in the two directions, thereby obtaining differences dx and dy between the subject images f1 and f2. For example, square sums of drifts between the respective projection components are obtained as correlation arithmetic output values as shown in FIGS. 9A and 9B. By calculating values dx and dy for minimizing these correlation arithmetic output values, the values correspond to differences between the images of the subject in the x and y directions. The two-dimensional correlation circuit 52 executes the two-dimensional correlation arithmetic operation based on the arithmetic algorithm as described above to easily and rapidly detect a difference between images of a subject formed on an imaging surface of the solid-state imaging device 42 in accordance with the luminance component Y of the subject image signal. This difference or drift detection is performed each time a subject image signal is repeatedly read out at a high speed from the solid-state imaging device 42.

Series of information of x and y displacements between images of a subject obtained by the two-dimensional correlation circuit 52 as described above are interpolated by interpolating circuits 54x and 54y to detect x and y and displacements with a precision of a pixel unit or less, and the detected x and y displacements are supplied to actuator drivers 38x and 38y, respectively.

Each time the subject image signal is repeatedly read out from the solid-state imaging device 42 at a high speed as described above, series of information about the and displacements obtained by the two-dimensional correlation circuit 52 are interpolated by interpolating circuits 54x and 54y and supplied to actuator drivers 38x and 38y of the actuator driving unit 38, respectively. The actuator drivers 38x and 38y respectively drive an x-direction actuator 30x and a y-direction actuator 30y constituting the actuator unit 30 to displace the photographic optical lens 12 in directions to correct the displacements in the x and y directions of the image of the subject.

Figure 3:
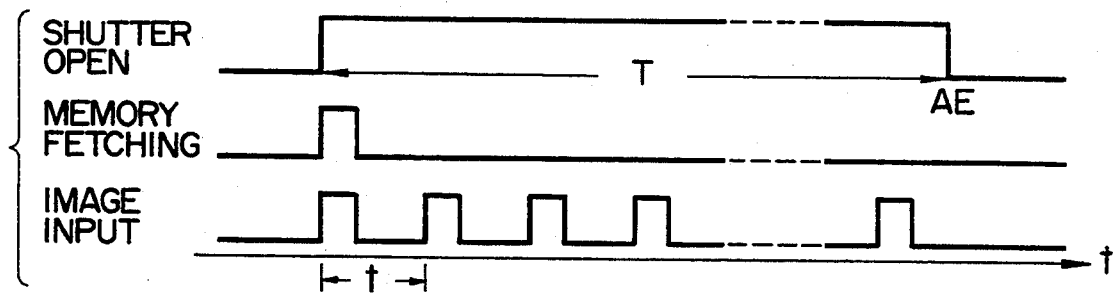
FIG. 3 is a timing chart showing image detection timings for drift detection with respect to shutter release.

That is, the driving system of the actuator unit 30 in this camera shake preventing circuit 32 is arranged to form a negative feedback loop with respect to a difference between images of a subject. The circuit 32 operates at a high speed in synchronism with a shutter release operation as shown in FIG. 3 and causes the solid-state imaging device 42 to repeatedly input an image of a subject during a film exposure period as a shutter open period. A difference between the subject image signal repeatedly imaged at a high speed by the solid-state imaging device 42 and the subject image signal of the first frame stored in the frame memory 50 immediately after the shutter release operation is performed is detected by a two-dimensional correlation arithmetic operation, and the actuator unit 30 is driven in accordance with the detected difference to displace the photographic optical lens 12 in a direction perpendicular to the optical axis of the lens 12. As a result, if a difference is produced between images of a subject formed on the film exposure surface 14 through the photographic optical lens 12, the difference between the subject images on the film exposure surface is corrected by the displacement of the photographic optical lens 12.

In this case, a compact device having, e.g., [8×8] pixels or [16×16] pixels is used as the solid-state imaging device 42, and a repetitive read period of an image signal is set to be as short as about 10 μsec. As a result, even if a shutter speed is comparatively high and a film exposure time is as short as about 250 μsec, a large number of subject image signals can be repeatedly obtained by the solid-state imaging device 42 within the film exposure period to execute the displacement control of the photographic optical lens 12 at a high speed with a high response speed by driving of the actuator unit 30, thereby effectively correcting a difference between images of a subject on the film exposure surface 14.

In addition, since an image of a subject is formed in an enlarged scale on the solid-state imaging device 42 through the enlarging optical lens 40, a difference or a drift can be detected with sufficiently high resolution even if the number of pixels constituting the device 42 is small. An enlargement magnification of the enlarging optical lens 40 may be determined in accordance with the resolution (pixel density) of the solid-state imaging device 42 and the resolution of a film.

Since the resolution of drift detection is increased and the speed of the drift detection operation is increased as described above, the displacement control of the photographic optical lens 12 with respect to a difference between images of a subject on the film exposure surface 14 caused by so-called camera shake can be performed at a high speed with good following characteristics. As a result, drift correction of the subject image is effectively executed on the film exposure surface 14 to perform high-resolution film exposure (photography) of the subject without so-called camera shake.

Figure 4:
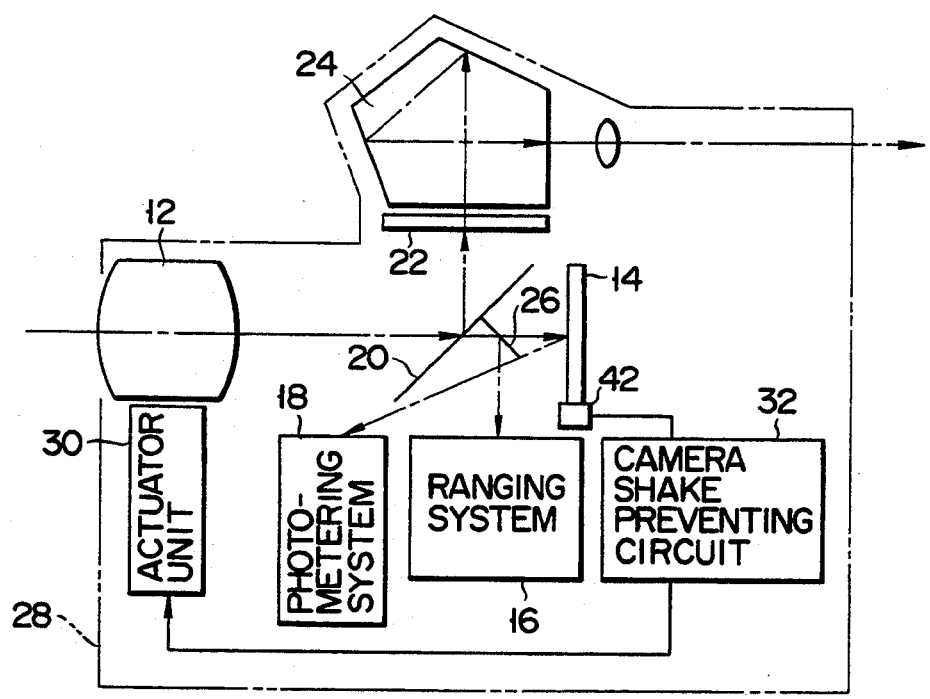
FIG. 4 is a block diagram showing an arrangement of a single-lens reflex camera as a camera apparatus according to the second embodiment of the present invention.

In the above embodiment, a portion of an image of a subject to be formed on the film exposure surface 14 through the photographic optical lens 12 is split by using the half mirror 34 and imaged on the solid-state imaging device 42. The use of the half mirror 34, however, reduces a light amount of a subject image formed on the film exposure surface 14 and complicates the optical system. In order to eliminate such an inconvenience, therefore, as shown in FIG. 4, the solid-state imaging device 42 for drift detection may be located at a position outside a photography region of the film exposure surface 14 to omit the half mirror 34 (the second embodiment).

More specifically, as shown in FIG. 5, an image circle A of the photographic optical lens 12 is set larger than a photography region B of the film exposure surface 14 so that an image of a subject is formed on a peripheral portion of the rectangular photography region B. In other words, exposure (photography) of an image of a subject is performed by using a film by masking the subject image, circularly formed within the range of the image circle A by the photographic optical lens 12, in accordance with the size of the film. The image of the subject is therefore formed on the peripheral portion of the film surface (photography region B). In order to detect a difference between images of a subject by using the subject image formed outside the photography region B, as shown in FIGS. 4 and 5, the solid-state imaging element 42 is arranged outside, e.g., above or below the photographic region of the film exposure surface 14, and the subject image signal is repeatedly obtained at a high speed as described above within the film exposure period by using the solid-state imaging device 42.

In this manner, the arrangement can be simplified since no half mirror 34 is used, and the problem of reduction in light amount of an image of a subject reaching the film exposure surface 14 can be solved.

Figure 6:
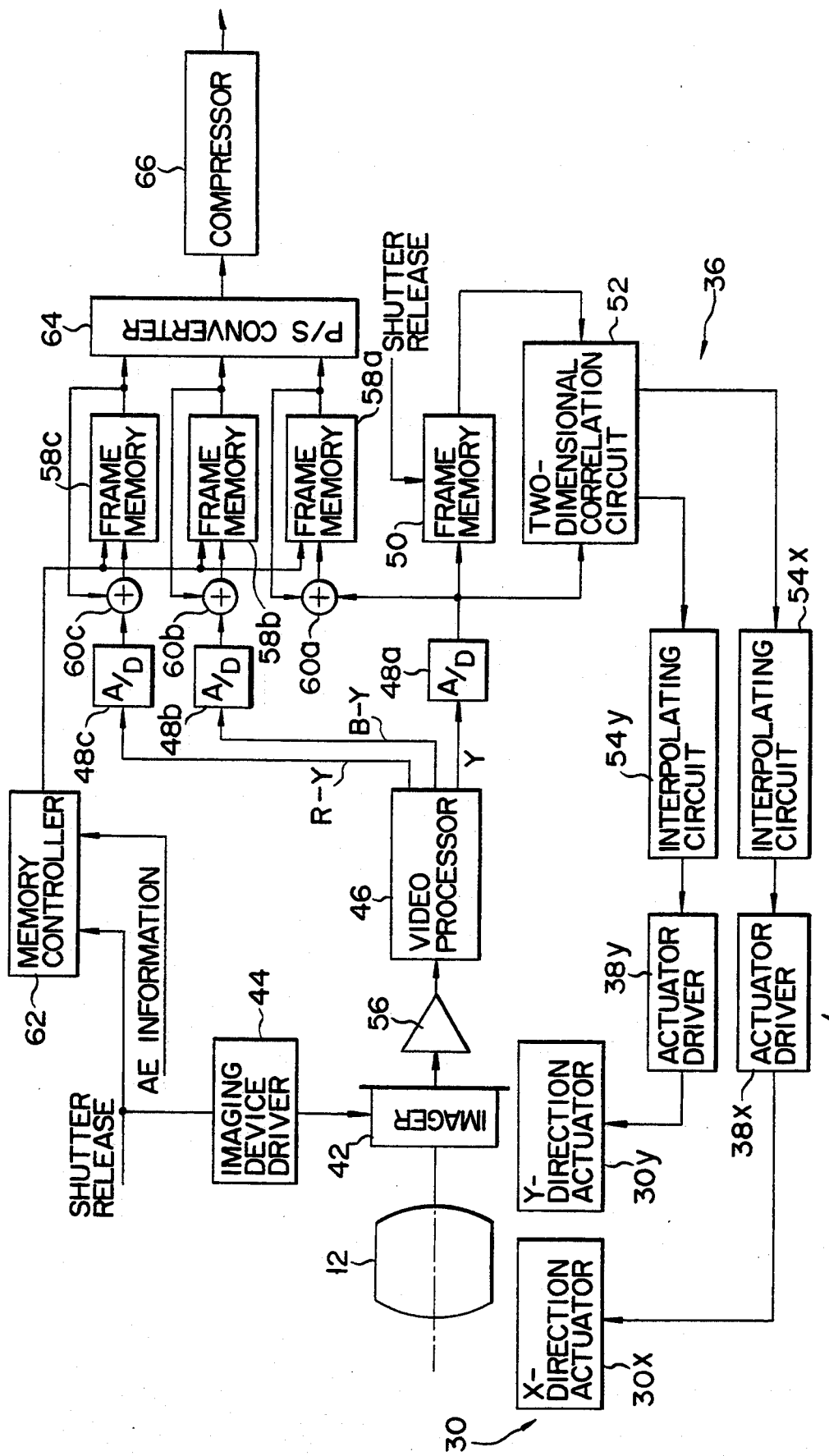
FIG. 6 is a block diagram showing an arrangement of an electronic camera as a camera apparatus according to the third embodiment of the present invention.
Figure 7:
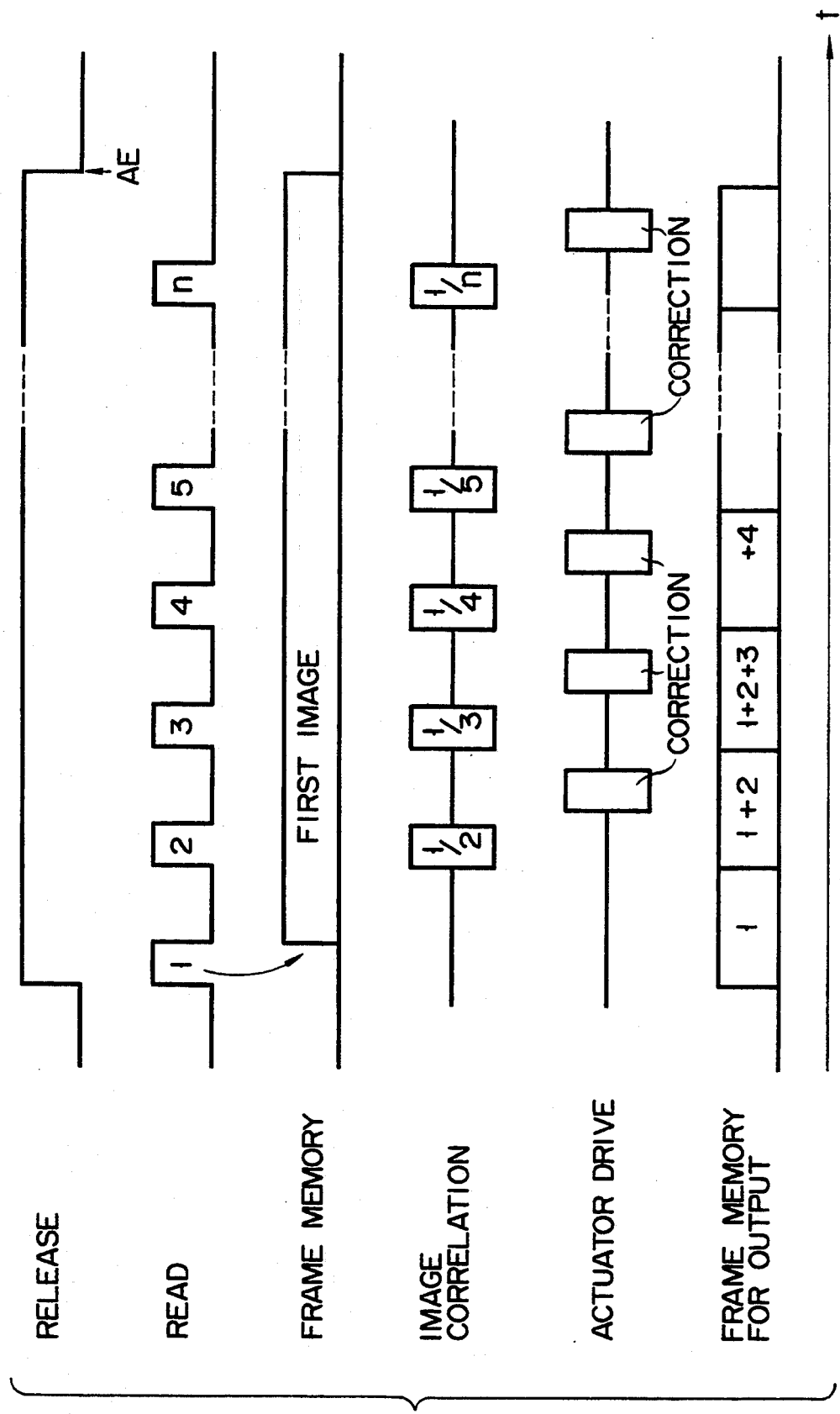
FIG. 7 is a timing chart showing operation timings of the electronic camera of the third embodiment.

FIG. 6 shows an arrangement of the third embodiment of the present invention in which the camera shake preventing circuit 32 described above is applied to an electronic camera. In FIG. 6, the same reference numerals as in FIG. 2 denote the same parts. FIG. 7 is a timing chart showing operation timings of the third embodiment.

A subject image signal repeatedly read out at a high speed from a solid-state imaging device (imager) 42 which is driven at a high speed by an imaging device driver 44 is amplified to be a predetermined signal level via a preamplifier 56 and input to a video processor 46. This video processor 46 converts the subject image signal into a luminance signal Y and color difference signals (R−Y) and (B−Y) and outputs the signals. The luminance signal Y and the color difference signals (B−Y) and (R−Y) output from the video processor 46 in this manner are digital-coded by A/D converters 48a, 48b, and 48c, respectively.

A frame memory 50 used in drift detection between images of a subject stores the first frame of the subject image signal (luminance signal Y) in synchronism with a shutter release operation. As in the first embodiment described above, this subject image signal of the first frame is used as a reference image signal (reference subject image) for drift detection with respect to subject image signals obtained from the second frame.

A two-dimensional correlation circuit 52 executes a two-dimensional correlation arithmetic operation between the subject image signal of the first frame stored in the frame memory 50 and each subject image signal fetched from the second frame and detects a difference between the image signals (frame images) as x and y displacements. This two-dimensional correlation arithmetic operation is performed by arbitrarily using various types of conventional arithmetic algorithms. That is, basically, projection components in x and y directions of two frame images f1 and f2 having a drift or difference with respect to time as shown in FIG. 8 are respectively compared with each other, and the difference is obtained as displacements in the two directions, thereby executing the two-dimensional correlation arithmetic operation.

More specifically, assuming that an image of a subject f1 is formed on the solid-state imaging device 42 as shown in FIG. 8, projection components are obtained by projecting the image signal in the y and x directions as indicated by g1 an h1, respectively. If the subject image moves as indicated by f2 as time passes, projection components g2 and h2 are obtained for the image f2. That is, if the image f1 moves in the x and y directions as indicated by f2, the projection components of the image also move from g1 and h1 to g2 and h2 in the x and y directions, respectively.

The two-dimensional correlation circuit 52 calculates a correlation between the projection components in the two directions, thereby obtaining differences dx and dy between the subject images f1 and f2. For example, square sums of drifts between the respective projection components are obtained as correlation arithmetic output values as shown in FIGS. 9A and 9B. By calculating values dx and dy for minimizing these correlation arithmetic output values, the values correspond to differences between the images of the subject in the x and y directions. The two-dimensional correlation circuit 52 executes the two-dimensional correlation arithmetic operation based on the arithmetic algorithm as described above to easily and rapidly detect a difference between images of a subject formed on an imaging surface of the solid-state imaging device 42 in accordance with the luminance component Y of the subject image signal. This difference or drift detection is performed each time a subject image signal is repeatedly read out at a high speed from the solid-state imaging device 42.

Series of information of x and y displacements between images of a subject obtained by the two-dimensional correlation circuit 52 as described above are interpolated by interpolating circuits 54x and 54y to detect x and y and displacements with a precision of a pixel unit or less, and the detected and displacements are supplied to actuator drivers 38x and 38y, respectively. The actuator drivers 38x and 38y drive an x-direction actuator 30x and a y-direction actuator 30y to displace a photographic optical lens 12 in directions to correct the displacements of the subject image in the x and y directions, respectively. While the photographic optical lens 12 is displaced by the x- and y-direction actuators 30x and 30y, the solid-state imaging device 42 inputs the image of the subject formed on the imaging surface of the device 42.

That is, the drive control system of the actuators 30x and 30y is arranged to form a negative feedback loop in order to displace the photographic optical lens 12 in a direction opposite to the direction of a difference between images of a subject. The solid-stage imaging device 42 is driven at a high speed as shown in FIG. 7 in synchronism with a shutter release operation to repeatedly input an image of a subject formed on its imaging surface within a photographing period determined under the control of a photometering system 18. The first frame of the subject image signal repeatedly input at a high speed by the solid-state imaging device 42 is stored in the frame memory 50. The two-dimensional correlation circuit 52 executes the two-dimensional correlation arithmetic operation between the subject image signal of the first frame obtained immediately after the shutter release operation and stored in the frame memory 50 and each subject image signal of the second and subsequent frames input thereafter, thereby detecting a difference or drift. The actuators 30x and 30y are driven in accordance with the detected drift to displace the photographic optical lens 12 in directions perpendicular to the optical axis of the lens 12.

As a result, if a difference is produced between images of a subject to be formed on the imaging surface of the solid-state imaging device 42 through the photographic optical lens 12, the produced difference between the images on the imaging surface is corrected by the displacement of the lens 12, and the solid-state imaging device 42 repeatedly inputs the image of the subject subjected to the drift correction at a high speed.

The high-speed driving of the solid-state imaging device 42 is performed such that an imaging operation and a read operation for an image signal are executed at a period of about 10 $\mu$sec. As a result, even if the photographing operation period determined by the photo-metering system described above is as short as about 250 $\mu$sec, a large number of subject image signals can be repeatedly obtained by the solid-state imaging device 42 during the period to execute the displacement control of the photographic optical lens 12 at a high speed with a high response speed by the driving by the actuators 30x and 30y, thereby effectively correcting the difference between the subject images on the imaging surface of the solid-state imaging device 42.

A subject image signal obtained by the solid-state imaging device 42 for rapidly and repeatedly inputting an image of a subject subjected to the drift correction on the imaging surface of the device 42 under the displacement control of the photographic optical lens 12 as described above is converted into a luminance signal Y and color difference signals (R−Y) and (B−Y) by the video processor 46, and the signals Y, (B−Y), and (R−Y) are digital-coded by the A/D converters 48a, 48b, and 48c, respectively. Three frame memories 58a, 58b, and 58c, arranged in correspondence with these three signal components, for generating output image signals, fetch and store the signal components digital-coded by the A/D converters 48a, 48b, and 48c via adders 60a, 60b, and 60c, respectively.

The adders 60a, 60b, and 60c read out the signal components stored in the frame memories 58a, 58b, and 58c, add newly input signal components to the readout signal components, and rewrite the obtained signal components in the frame memories 58a, 58b, and 58c, thereby obtaining accumulated values of the signal components in the frame memories 58a, 58b, and 58c, respectively. An accumulative arithmetic circuit using the frame memories 58a, 58b, and 58c and the adders 60a, 60b, and 60c is driven by a memory controller 62 in synchronism with the shutter release operation described above throughout the photographing operation period determined by the photo-metering system as described above.

Since the accumulated sum values of the luminance signal Y and the color difference signals (R−Y) and (B−Y) of each subject image signal repeatedly imaged at a high speed as described above are obtained in this manner, the level of the individual subject image signal is increased to widen the dynamic range of the signal.

That is, in this electronic camera apparatus, the electronic image input of a subject is repeatedly performed at a high speed by the solid-state imaging device 42, and an exposure time in each subject imaging is set to be shorter than that originally required. Therefore, a generation amount of a signal charge corresponding to the light amount of a subject in the solid-state imaging device 42 is increased in proportion to the exposure time, i.e., the generation amount of the signal charge is naturally decreased when the exposure time is set short. For this reason, the levels of the individual subject image signals repeatedly imaged at a high speed are decreased to be very low. In other words, an exposure amount with respect to a low-luminance component in a subject of each subject image signal becomes insufficient in correspondence with the short exposure time.

In order to solve the problem of an insufficient exposure amount, in the third embodiment, the individual subject image signals repeatedly input at a high speed in order to perform the above difference or drift detection are repeatedly accumulated a plurality of times to increase the level of each image signal by the number of repeating times, thereby substantially widening the dynamic range of the signal to ensure a required signal level. For example, therefore, image signals are repeatedly read out times within the photographing operation period determined under the control of the photo-metering system and accumulated. As a result, an accumulated image signal having a level (dynamic range) $\sqrt{n}$ times that of each image signal is output.

A random noise component of a dark current mixed in an image signal obtained by the solid-state imaging device 42 is $\sqrt{n}$ times when an accumulation number is n. In this case, since a signal component is n times, a dynamic range of the subject signal is $n/\sqrt{n}=\sqrt{n}$ times.

The luminance signal Y and the color difference signals (R−Y) and (B−Y) having enlarged signal levels as described above are read out from the frame memories 58a, 58b, and 58c, respectively, data-compressed by a compressor 66 via a parallel/serial (P/S) converter 64, and recorded in a predetermined recording medium (not shown). Alternatively, these signals are converted into a television signal such as an NTSC signal and used in image reproduction performed by a TV receiver or the like.

According to the camera apparatus having the above arrangement, a difference between images of a subject formed on the imaging surface of the solid-state imaging device 42 is effectively corrected to perform high-solution photography without so-called image shake.

In each of the first to third embodiments described above, differences between images of a subject in the x and y directions are calculated by the two-dimensional correlation arithmetic operation from subject image signals repeatedly obtained at a high speed by the solid-state imaging device 42. This calculation, however, can be realized by a one-dimensional correlation arithmetic operation in each of the x and y drift directions.

Figure 10:
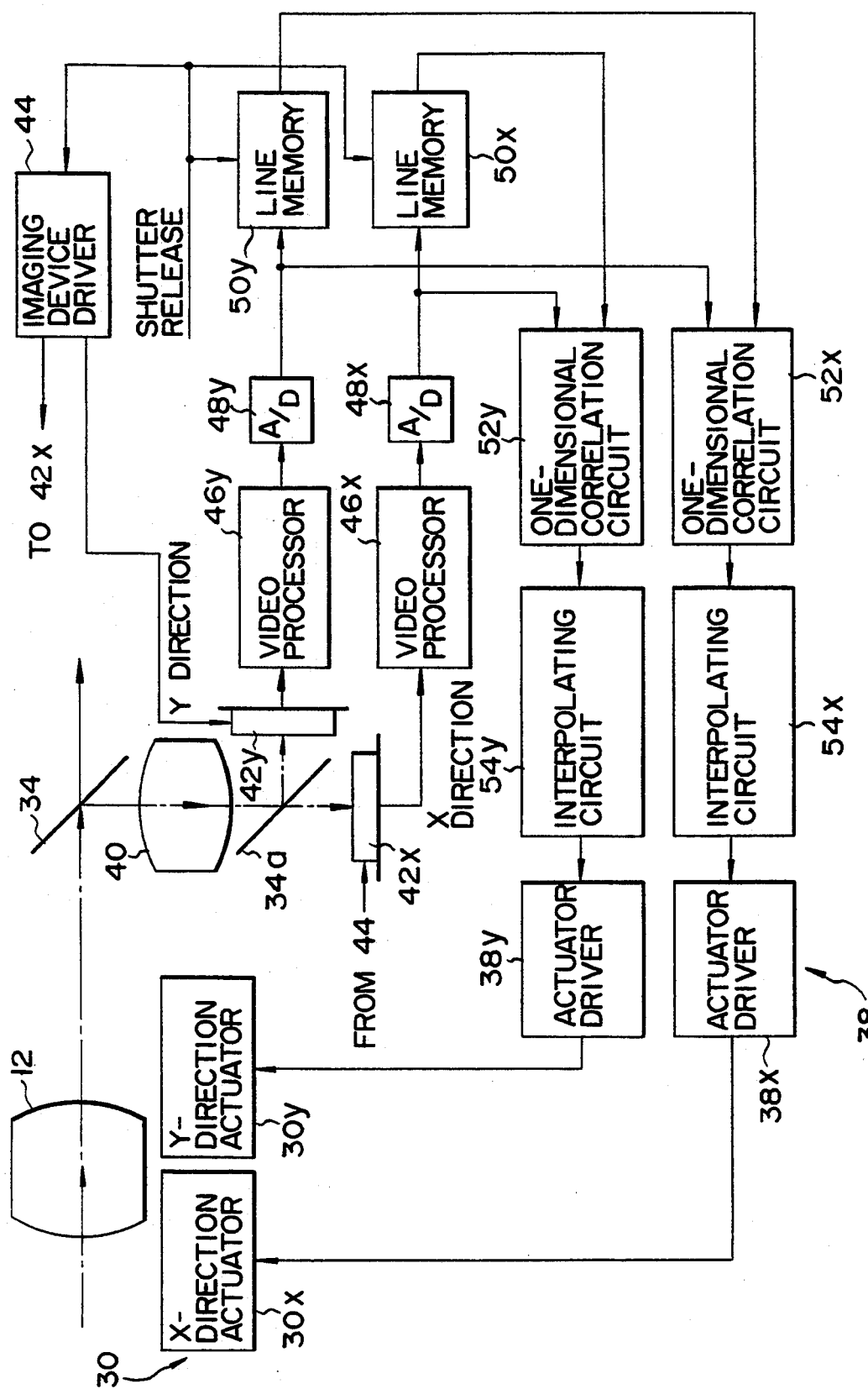
FIG. 10 is a block diagram showing an arrangement of a camera shake preventing circuit and its peripheral circuits in a single-lens reflex camera as a camera apparatus according to the fourth embodiment of the present invention.

FIG. 10 shows a schematic arrangement of a main part of a single-lens reflex camera according to the fourth embodiment of the present invention for this purpose. In this camera, an image of a subject guided through an enlarging optical lens 40 is split by using another half mirror 34a and input by using a solid-stage imaging device 42x for x-direction drift detection and a solid-state imaging device 42y for y-direction drift detection.

Figure 11A:
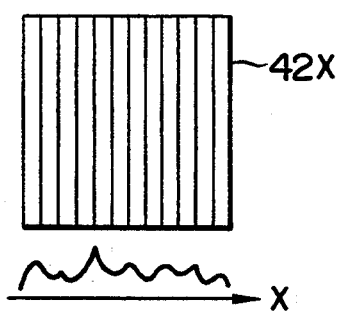
FIGS. 11A and 11B are views each showing an arrangement of a solid-state imaging device used in the camera of the fourth embodiment.
Figure 11B:
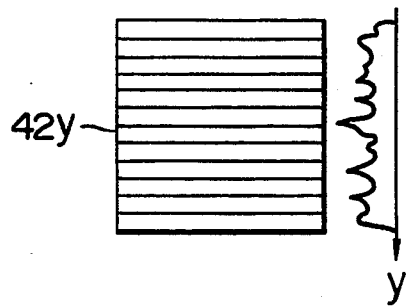

Structures in which photoelectric converters of imaging surfaces are one-dimensionally arranged in the x and y direction as shown in FIGS. 11A and 11B are used as the solid-state imaging devices 42x and 42y, respectively. The solid-state imaging device 42x for x-direction drift detection is arranged to obtain an x-direction one-dimensional signal by accumulating image signals of an image of a subject formed on the device, and the solid-state imaging device 42y for y-direction drift detection is arranged to obtain a y-direction one-dimensional signal by accumulating image signals of a subject image formed on the device. That is, the solid-state imaging devices 42x and 42y directly obtain projection components in the x and y directions of an image of a subject formed on the elements and read out the projection components as one-dimensional image signal components in the x and y directions.

The one-dimensional image signal components in the x and y directions read out by the solid-state imaging devices 42x and 42y are input to video processors 46x and 46y, subjected to predetermined signal processing, and digital-converted by A/D converters 48x and 48y, respectively.

Line memories 50x and 50y store the first frames of the one-dimensionally compressed subject image signal components (one-dimensional projection components of subject image signals) obtained by the solid-state imaging devices 42x and 42y in synchronism with the shutter release operation described above as reference image signals for use in drift detection with respect to signal components of the subject image fetched from the second frame. One-dimensional correlation circuits 52x and 52y respectively execute one-dimensional correlation operations between the subject image signal component of the first frame and each subject image signal of the second and subsequent frames and detect differences or drifts in the x and y directions between the image signals (frame images).

The drifts in the x and y directions obtained by the one-dimensional correlation circuits 52x and 52y in this manner are supplied to actuator drivers 38x and 38y to displace a photographic optical lens 12 in the x and y directions, respectively.

That is, in this embodiment, the solid-state imaging devices 42x and 42y as shown in FIGS. 11A and 11B are used to directly obtain projection components in the x and y directions of an image of a subject formed on the devices. Since one-dimensional signals are obtained as the projection components of the subject image by the solid-state imaging devices 42x and 42y as described above, the line memories 50x and 50y are used to store reference signals for drift detection in the x and y directions, respectively. As a result, the drift detection can be easily performed at a high speed by only executing one-dimensional arithmetic operations.

The signals obtained by the solid-state imaging devices 42x and 42y will be described in more detail below. Assuming that a subject image f1 is formed on the solid-state imaging devices 42x and 42y as shown in FIG. 8, the devices 42x and 42y obtain one-dimensional projection components g1 and h1 obtained by projecting the image signal in the x and y directions, respectively. If the subject image is moved as indicated by f2 while the projection components g1 and h1 are stored in the line memories 50x and 50y, respectively, one-dimensional projection components g2 and h2 are obtained from the solid-state imaging devices 42x and 42y, respectively. That is, the projection components g2 and h2 are moved in the x and y directions respectively in correspondence with the drifts in the x and y directions.

When correlations of the projection components in the two directions are calculated, correlation arithmetic output values, e.g., square sums of the drifts are obtained as shown in FIGS. 9A and 9B, and positions dx and dy for minimizing the outputs are obtained as drifts in the x and y directions, respectively. In this manner, the drift detection is easily performed at a high speed by the one-dimensional correlation arithmetic operations.

According to the camera having the above arrangement, since the image arithmetic processing for drift detection can be one-dimensionally executed, the arithmetic circuit of the camera can be largely simplified.

This arrangement of calculating a drift by the one-dimensional correlation arithmetic operation according to the fourth embodiment can be applied to an electronic camera.

In each of the above embodiments, the exclusive solid-state imaging devices 42, 42x, and 42y are incorporated in order to detect a difference between images of a subject. A ranging or photo-metering optical device (imaging device) used in the ranging system 16 or the photo-metering system 18, however, can also be used as the solid-state imaging device 42 for detecting a difference between images of a subject.

Figure 12:
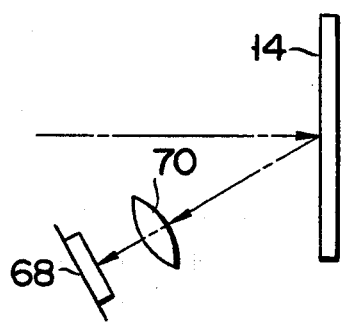
FIG. 12 is a view showing an arrangement of a device serving as both a photometric optical device and a solid-state imaging device for drift detection according to the fifth embodiment of the present invention.
Figure 13:
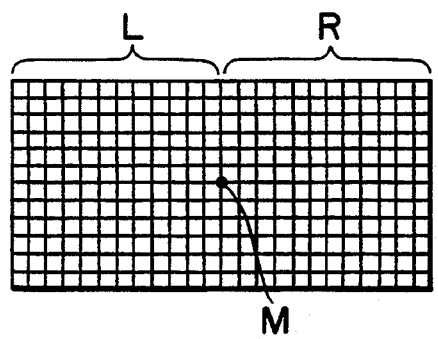
FIG. 13 is a view showing a modification of the drift detecting solid-state imaging device.

FIG. 12 shows an arrangement of a photometering optical device (imaging device) 68 of a photometering system 18. In this fifth embodiment, the optical device (imaging device) 68 is incorporated in an exposure chamber (mirror chamber) of a camera main body (apparatus main body) 28 so as to receive an image of a subject reflected by a film exposure surface 14 through an imaging lens 70. The image formation surface of the optical device (imaging device) 68 is divided into two, left and right areas L and R by an optical center (optical axis) M as shown in FIG. 13, and a difference between images of a subject is independently detected in each of the areas L and R.

Figure 14:
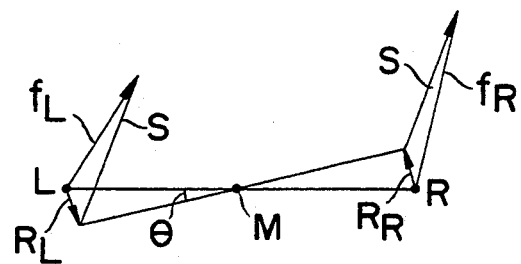
FIG. 14 is a view for explaining a principle of drift detection using the solid-state imaging device.

More specifically, a difference between subject images repeatedly obtained from each of the areas L and R is calculated by a correlation arithmetic operation as described above on the basis of the central position of each area, thereby obtaining differences $dx_L$ and $dy_L$ between the subject images in the area L and difference $dx_R$ and $dy_R$ therebetween in the area R. Assuming that a vector of a drift indicated by the differences $dx_L$ and $dy_L$ between the subject images in the area L is $f_L$ and a vector of a drift indicated by the differences $dx_R$ and $dy_R$ therebetween is $f_R$, these vectors $f_L$ and $f_R$ are considered as sums of rotational movement vector components $R_L$ and $R_R$ at an angle $\theta$ around the optical axis M and a translation vector component S, i.e., considered as vector sums represented by:

$$f_L = R_L + S, f_R = R_R + S$$

as shown in FIG. 14.

Note that the rotational movement vector components $R_L$ and $R_R$ described above are generated due to, e.g., an inclination of a camera upon a shutter release operation. Since the drifts in the areas L and R obtained as described above are basically symmetrical about the optical axis M, the following relation is established between the rotational vector components $R_L$ and $R_R$:

$$R_L + R_R 0.$$

As a result, as is apparent from FIG. 14 schematically showing the vectors, a vector indicating a difference between the entire images of a subject is calculated as:

translation amount;

$$S = (f_L + f_R)/2$$

rotational moving amount;

$$R_L = (f_L - f_R)/2.$$

As a result, differences in the x and y directions between the subject images can be obtained by dividing the translation amount S in the x and y directions, and correction for the differences or drifts can be performed in the same manner as described above.

In this case, a rotational difference between images of a subject is also obtained. Therefore, the difference or drift correction for the subject image can be performed with higher precision by executing correction for this rotational difference.

Figure 15:
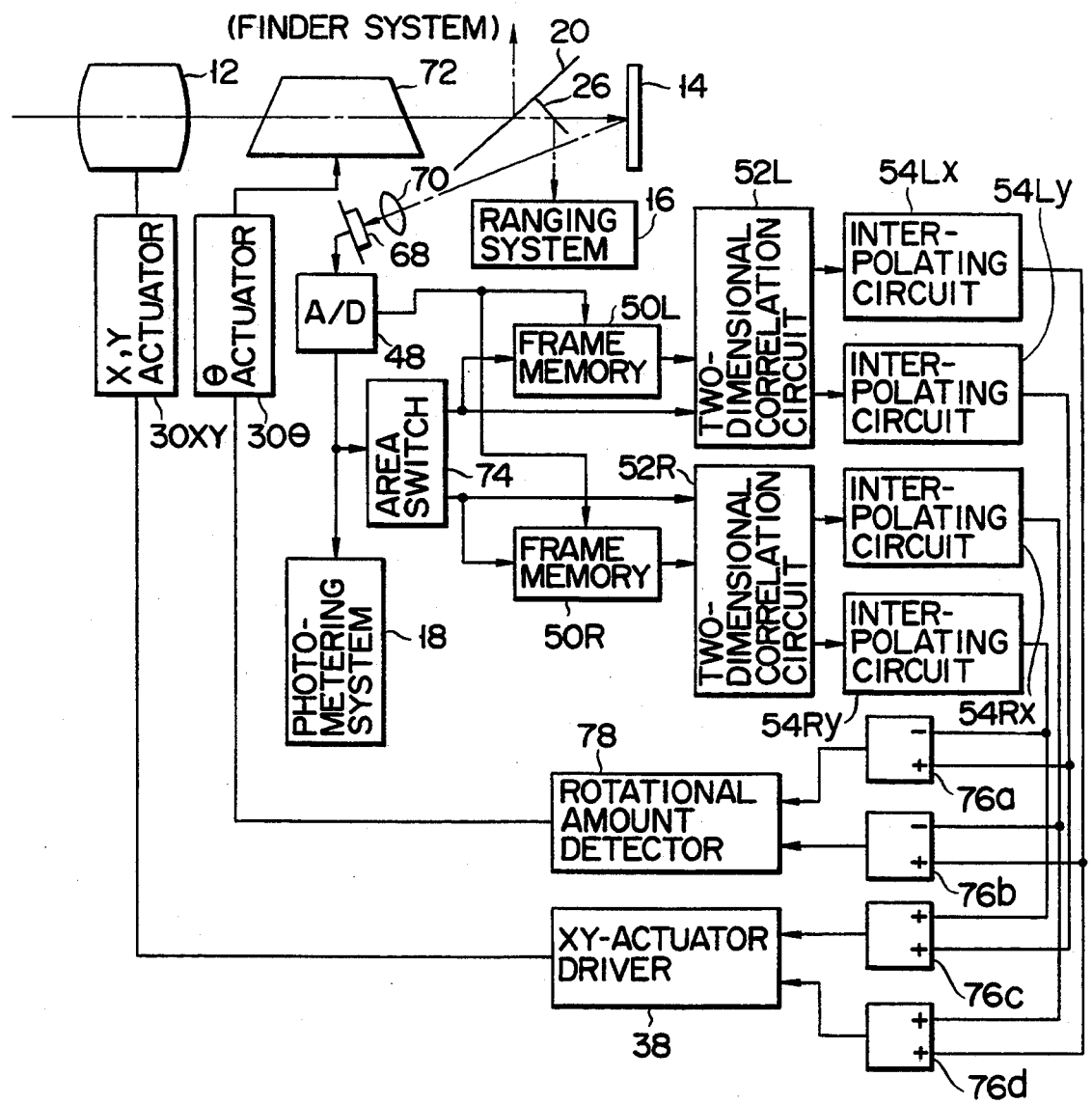
FIG. 15 is a block diagram showing an arrangement of a single-lens reflex camera incorporating an optical correcting mechanism with respect to a rotational drift as a camera apparatus according to the sixth embodiment of the present invention.

A single-lens reflex camera according to the sixth embodiment of the present invention in which the above rotational difference correction is also performed will be described below. A characteristic feature of this sixth embodiment is that even if a rotational difference is detected between images of a subject and a photographic optical lens 12 is rotated about its optical axis M on the basis of the detected rotational difference, no change is produced in the subject image formed on a film exposure surface 14 through the photographic optical lens 12. For this purpose, in order to correct a rotational difference between images of a subject, a Dove prism 72 is incorporated in a photographic optical system as shown in FIG. 15 and rotationally displaced about its optical axis to perform correction for the rotational difference.

Figure 16:
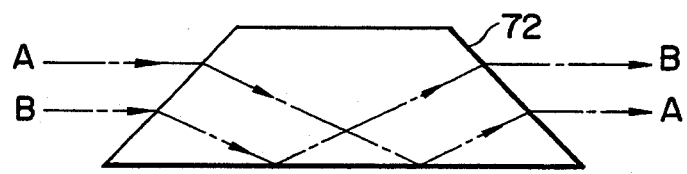
FIG. 16 is a view showing an effect of a prism used in the sixth embodiment.

As shown in FIG. 16, the Dove prism 72 has a property of inverting and outputting an optical image incident on its prism surface. When the Dove prism 72 is rotationally displaced about its optical axis M, therefore, an output optical image can be inclined in accordance with the rotational displacement of the prism. Therefore, a rotational difference or drift can be optically corrected by rotationally displacing the Dove prism 72 in accordance with the rotational difference or drift.

When the Dove prism 72 is incorporated in a photographic optical system, however, an image of a subject formed on the film exposure surface is inevitably an inverted image obtained by so-called mirror surface reflection. In an actual arrangement, therefore, another Dove prism or a mirror may be inserted in the optical system to return the subject image formed on the film exposure surface to an erect image.

In addition, the inverted image can be returned to an erect image by turning over and printing the film. The camera of the sixth embodiment capable of performing correction for also a rotational difference or drift is arranged as shown in FIG. 15.

That is, in this embodiment, a subject image signal detected by using an optical device (imaging device) 68 as shown in FIG. 13 for photometry and drift detection is digital-converted by an A/D converter 48 and fetched. The fetched signal is supplied to a photo-metering system 18 and at the same time extracted as signals of areas L and R describe above via an area switch 74. The first frames of the image signals in the areas L and R are stored in frame memories 50L and 50R, respectively. Thereafter, two-dimensional correlation circuits 52L and 52R execute correlation arithmetic operations between the stored signals and signals of the areas L and R repeatedly read out at a high speed from the optical device (imaging device) 68. In accordance with the correlation arithmetic operations performed by the two-dimensional correlation circuits 52L and 52R, a difference $f_L$ ($dx_L$, $dy_L$) and a difference $f_R$ ($dx_R$, $dy_R$) in the areas L and R are respectively calculated.

Series of the differences $f_L$ ($dx_L$, $dy_L$) and $f_R$ ($dx_R$, $dy_R$) calculated from the subject image signals of the areas L and R repeatedly obtained at a high speed as described above are interpolated by interpolating circuits 54Lx and 54Ly and interpolating circuits 54Rx and 54Ry, respectively, and these pieces of information about the differences are input to subtracters 76a and 76b and adders 76c and 76d to calculate a rotational difference or drift and a translation difference or drift.

More specifically, the subtracters 76a and 76b respectively calculate:

$$(dx_L - dx_R)/2, (dy_L - dy_R)/2$$

and a rotational amount detector 78 calculates a rotational difference or drift $|RL|$ in accordance with the following equation:

$$|RL| = \sqrt{(dx_L - dx_R)^2 + (dy_L - dy_R)^2}$$

In this case, since $R_L$ is a vector amount while the rotational difference or drift is a scalar amount, $|R_L|$ is calculated. A $\theta$ actuator $30\theta$ is driven in accordance with the rotational drift $|R_L|$ to rotationally displace the Dove prism 72 about the optical axis of the prism, thereby performing correction for the rotational drift.

The adders 76c and 76d respectively calculate:

$$(dx_L + dx_R)/2, (dy_L + dy_R)/2$$

in accordance with the above respective differences, thereby calculating translation amount components in the x and y and directions. An xy-actuator driver 38 is activated by these signals to drive an xy actuator 30xy, thereby displacing the photographic optical lens 12 in the x and y directions to correct the translation difference between the images of the subject.

By incorporating the correcting means for a drift or a difference between images of a subject as described above, not only differences in the x and y directions but also a rotational drift or a rotational difference between images of a subject formed on the film exposure surface 14 can be effectively corrected. As a result, high-resolution photography can be performed without so-called image shake.

This rotational drift correction can be naturally applied to an electronic camera.

In the sixth embodiment described above, a rotational drift is corrected by using the Dove prism 72, and a translation drift is optically corrected by displacing the photographic optical lens 12 in the x and y directions. Rotational and translation drifts, however, can be corrected by rotating and translating a fiber bundle. Alternatively, the film exposure surface 14 itself can be displaced to perform the drift correction.

Figure 17:
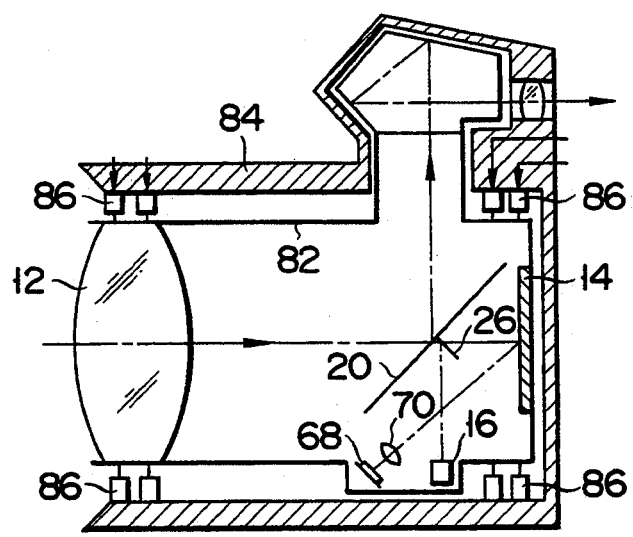
FIGS. 17 and 18 are sectional views showing arrangements of single-lens reflex cameras each incorporating a mechanical correcting function with respect to a rotational drift as camera apparatuses according to the seventh and eighth embodiments.

In this case, as shown in FIG. 17, the entire imaging system up to the film exposure surface 14 including the photographic optical lens 12 is incorporated in an inner housing member 88, and the inner housing member 82 is supported by voice coils 86 so as to be movable with respect to an outer housing member 84 as a camera apparatus main body 28 (the seventh embodiment). The voice coils 86 are driven in accordance with a drift or difference between images of a subject to displace an optical positional relationship of the entire imaging system with respect to the subject, thereby correcting the drift as a whole.

Figure 18:
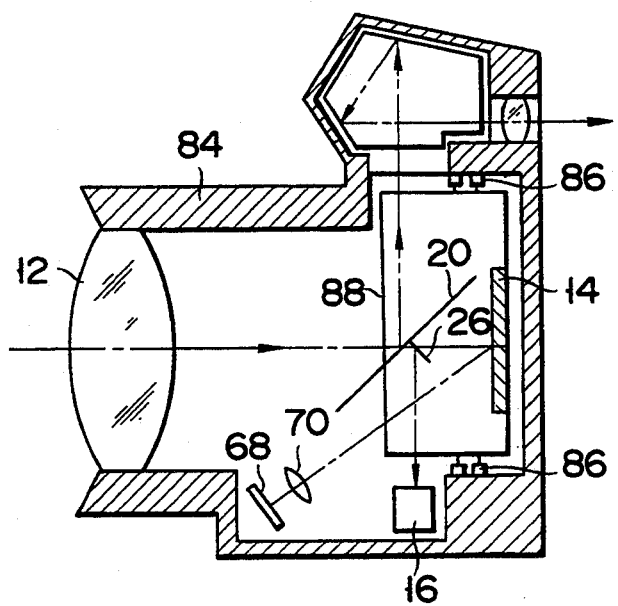

Alternatively, as shown in FIG. 18, the entire film exposure surface 14 including a film is incorporated in an inner housing member 88, and the inner housing member 88 is supported by voice coils 86 so as to be movable with respect to an outer housing member 84 as a camera apparatus main body 28 (the eighth embodiment). The voice coils 86 are driven in accordance with a drift or a difference between images of a subject to displace an optical positional relationship of the film exposure surface 14 with respect to the subject, thereby correcting the drift. In this case, a photographic optical lens 12 is incorporated in the outer housing member 84 as the camera apparatus main body 28.

Figure 19:
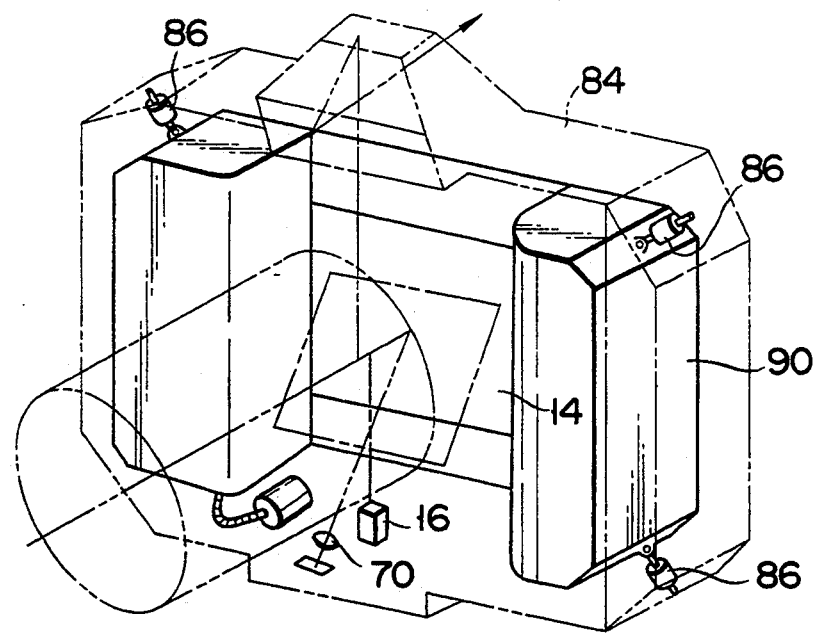
FIG. 19 is a schematic perspective view showing a housing structure of the camera of the seventh and eighth embodiments.

That is, each of the embodiments shown in FIGS. 17 and 18 is realized by supporting a film storage portion 90 (inner housing member 88) having at least the film exposure surface 14 by four voice coils 86 arranged to be symmetrical in vertical and horizontal directions so as to be movable in four directions with respect to the housing member 84 indicated by a dotted line as shown in FIG. 19, thereby obtaining a double housing structure.

Figure 20:
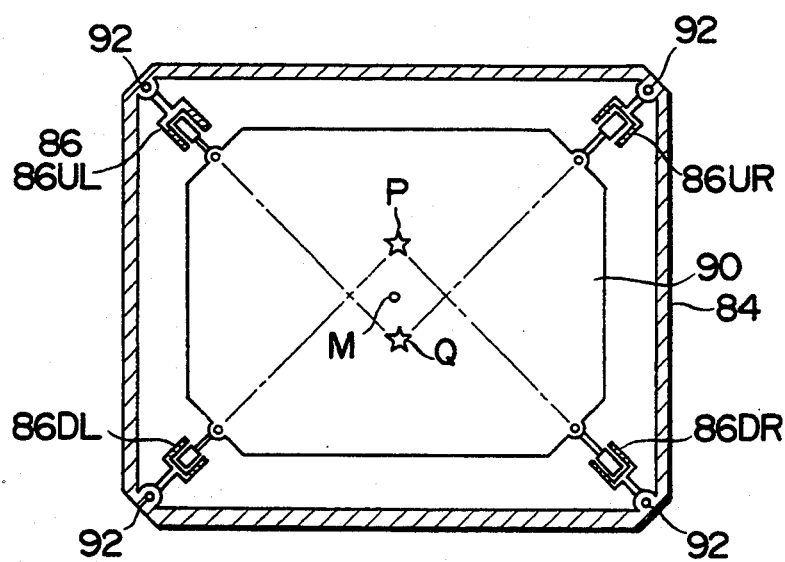
FIG. 20 is a view showing a support structure of an inner housing member in a double housing structure.

The inner housing member 88 is supported by the four voice coils 86 with respect to the outer housing member 84 such that, as shown in FIG. 20, support directions are set toward upper and lower support points P and Q off-centered from the optical axis M. That is, support directions of the voice coils 86UL and 86UR with respect to the inner housing member 88 are directed toward the support point Q set below the optical axis M, and support directions of the lower voice coils 86DL and 86DR with respect to the inner housing member 88 are directed toward the support point P set above the optical axis M. Note that each of the voice coils 86UL, 86UR, 86DL, and 86DR is mounted on the outer housing member 84 via a rotary joint 92 so that an expandable shaft of each voice coil 86 is not twisted due to a displacement of the inner housing member 88.

According to the double housing structure assembled as described above, when the two left voice coils 86UL and 86DL are expanded and the two right voice coils 86UR and 86DR are contracted, a rightward moving vector is generated as shown in FIG. 21A, and the inner housing member 88 is displaced to the right with respect to the outer housing member 84, when this expansion/contraction relationship between the voice coils 86UL, 86UR, 86DL, and 86DR is reversed, a leftward moving vector is generated to displace the inner housing member 88 to the left with respect to the outer housing member 84.

When the two upper voice coils 86UL and 86UR are contracted and the two lower voice coils 86DL and 86DR are expanded, an upward moving vector is generated as shown in FIG. 21B, and the inner housing member 88 is displaced upward with respect to the outer housing member 84. When this expansion/contraction relationship between the voice coils 86UL, 86UR, 86DL, and 86DR is reversed, a downward moving vector is generated to displace the inner housing member 88 downward with respect to the outer housing member 84.

In this manner, the inner housing member 88 is displaced vertically or horizontally with respect to the outer housing member 84 by complimentarily expanding/contracting the voice coils 86UL, 86UR, 86DL, and 86DR constituting upper and lower pairs or right and left pairs. In addition, by adjusting expansion/contraction amounts of the voice coils 86UL, 86UR, 86DL, and 86DR, the vertical and horizontal displacements are synthesized to displace the inner housing member 88 obliquely with respect to the outer housing member 84.

When the voice coils 86UR and 86DL constituting a pair in the diagonal direction are expanded, since vectors in the expansion directions are directed toward the support points P and Q off-centered from the optical axis M as described above as shown in FIG. 21C, a torsional vector is generated about the optical axis M. As a result, the inner housing member 88 is rotated clockwise about the optical axis M with respect to the outer housing member 84. To the contrary, when the other pair of voice coils 86UL and 86DR are expanded, a reverse torsional vector is generated about the optical axis M as shown in FIG. 21D, and the inner housing member 88 is rotated counterclockwise about the optical axis M with respect to the outer housing member 84. In this case, voice coils not concerning a rotational displacement of the inner housing member 88 are subjected to a displacement corresponding to the rotational displacement.

In this manner, the voice coils 86UL, 86UR, 86DL, and 86DR are selectively expanded/contracted to rotate the inner housing member 88, thereby correcting a rotational drift or difference between images of a subject formed on the film exposure surface 14. When this rotational drift correction is combined with the control of translation displacement described above, the rotational drift and the translation drift of the subject images can be effectively corrected.

In the correction of a drift or difference between images of a subject formed on the film exposure surface 14 performed by using the arrangement in which the inner housing member 88 is supported to be displaced with respect to the outer housing member 84, if the photographic optical lens 12 is incorporated in the inner housing member 82 as shown in FIG. 17, the optical axis M itself of the photographic optical system can be inclined by independently controlling a displacement on the photographic optical lens 12 side and that on the film exposure surface 14 side. When such a displacement control method is adopted, therefore, not only the vertical or horizontal drift and the rotational drift with respect to the optical axis M of an image of a subject can be corrected, but also a drift with respect to yawing or pitching can be effectively corrected.

In addition, according to each of the seventh and eighth embodiments, an adverse influence of unintentional movement of the hands (camera shake) itself hardly occurs. That is, when the positional relationship between the outer housing member and the inner housing member is relatively changed, a counterelectromotive force is generated in the voice coils to suppress a displacement caused by camera shake. In this case, if the weight of the inner housing member is larger than that of the outer housing member, a larger inertia force is applied on the inner housing member than that on the outer housing member. Therefore, a force is applied to return the outer housing member to its original position in accordance with a law of kinetic conservation. As a result, the camera shake is effectively suppressed. Furthermore, since the above arrangement of voice coils can cope with any of a vertical motion, a horizontal motion, rotation, yawing, or pitching, any camera shake can be suppressed.

The voice coils as described in the above seventh and eighth embodiments can be naturally applied to an electronic camera.

Figure 22:
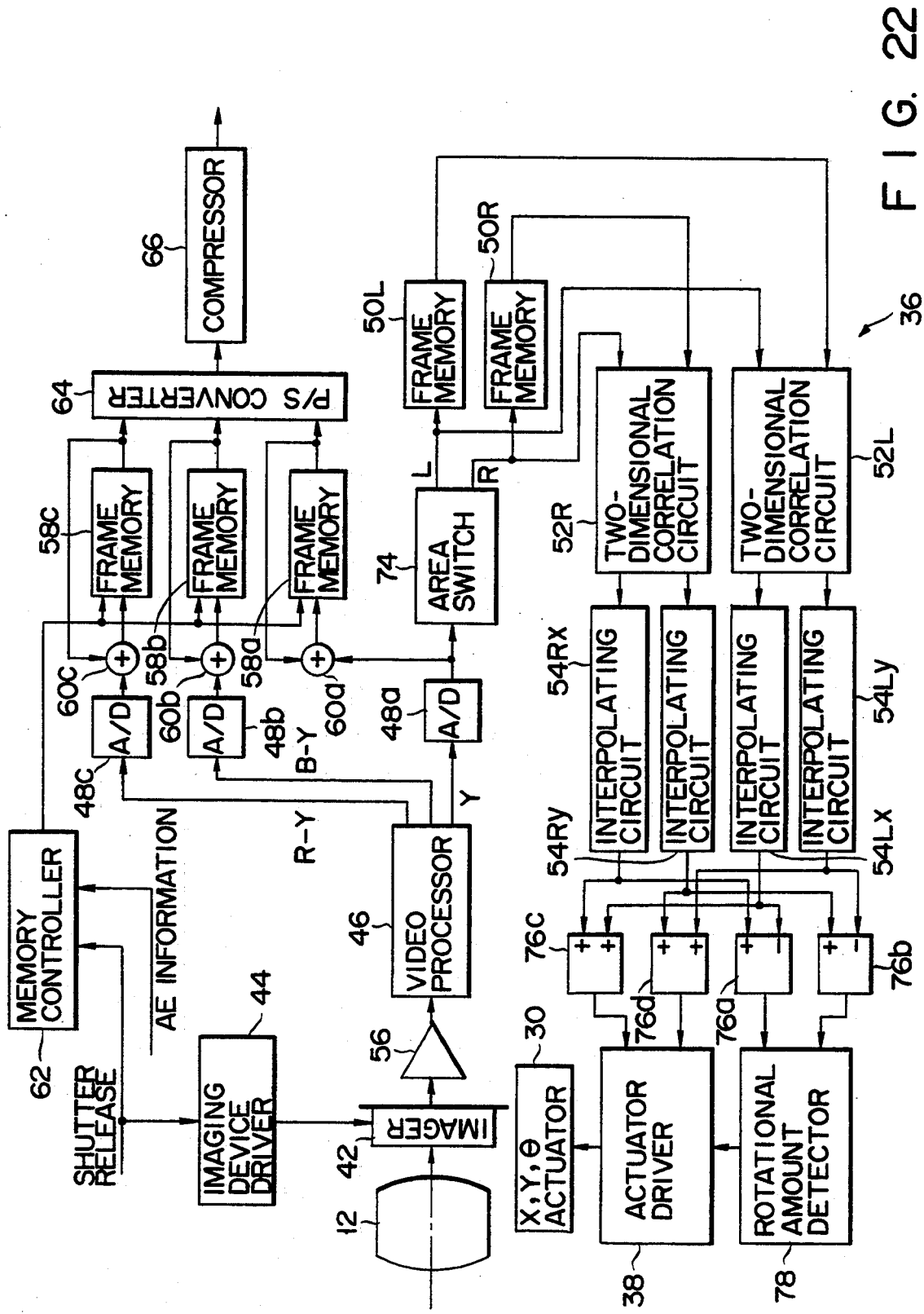
FIG. 22 is a block diagram showing an arrangement of an electronic camera as a camera apparatus according to the ninth embodiment of the present invention.

FIG. 22 shows an arrangement of the ninth embodiment of the present invention capable of correcting a rotational drift.

A characteristic feature of the present invention is that a solid-state imaging device 42 is supported via an $xy\theta$ actuator 30 which can be displaced in the x and y directions and can be rotationally displaced about an optical axis M of the device 42 and a control system is arranged to control an actuator driver 38 to displace a photographic optical lens 12 in the and $\theta$ directions.

That is, in the control system of the ninth embodiment, two, left and right areas L and R are set by the optical center (optical axis) M in the imaging surface of the solid-state imaging device 42 as shown in FIGS. 23A and 23B, a drift or a difference between images of a subject is independently detected in each of the areas L and R, and translation displacements in the x and y directions and a rotational displacement $\theta$ about the optical axis M of the entire subject image are calculated in accordance with the detected drifts in the areas L and R.

More specifically, the drifts in the x and y directions between the subject images can be obtained in the same manner as described above with reference to FIG. 4 to enable correction of the drifts.

At the same time, correction for the rotational drift is performed in accordance with the rotational drift of the subject images. As a result, the drift correction for the subject images can be executed more precisely.

That is, in this ninth embodiment, a luminance component Y obtained by digital-converting a subject image signal repeatedly input at a high speed by the solid-state imaging device 42 is supplied to an area switch 74 to extract subject image signals (partial image signals) of the areas L and R. The first frames of the image signals of the areas L and R are stored in frame memories 50L and 50R, respectively, and two-dimensional correlation circuits 52L and 52R respectively execute correlation arithmetic operations between the stored signals and signals of the areas L and R repeatedly read out at a high speed by the solid-state imaging device 42. Drifts or differences (vectors) $f_L(dx_L, dy_L)$ and $f_R(dx_R, dy_R)$ of the areas L and R are respectively calculated by the correlation arithmetic operations performed by the two-dimensional correlation circuits 52L and 52R.

Series of the drifts $f_L(dx_L, dy_L)$ and $f_R(dx_R, dy_R)$ calculated from the subject image signals of the areas L and R repeatedly obtained at a high speed as described above are interpolated by interpolating circuits 54Lx, 54Ly, 54Rx, and 54Ry, respectively, to detect drifts with a precision of a pixel unit or less. Thereafter, pieces of information about the detected drifts are input to subtracters 76a and 76b and adders 76c and 76d to obtain a rotational drift and a translation drift.

More specifically, the subtracters 76a and 76b respectively calculate:

$(dx_R - dx_L)/2$, $(dy_R - dy_L)/2$.

These values are supplied to a rotational amount detector 78. The detector 78 executes the following arithmetic operation to calculate a rotational drift $|R_L|$:

$$|RL| = \sqrt{(dx_R - dx_L)^2 + (dy_R - dy_L)^2}.$$

In this case, since $R_L$ is a vector amount while the rotational drift is a scalar amount, $|R_L|$ is calculated. The actuator driver 38 is controlled in accordance with this rotational drift $|R_L|$ to drive the $xy\theta$ actuator 30. The $xy\theta$ actuator 30 rotationally displaces the solid-state imaging device 42 about the optical axis of the device, thereby correcting the rotational drift.

The adders 76c and 76d respectively calculate:

$(dx_L + dx_R)/2$, $(dy_L + dy_R)/2$ in accordance with the above drifts, thereby calculating translation amount components in the x and y directions.

The actuator driver 38 is activated in accordance with the calculated drifts to drive the $xy\theta$ actuator 30, thereby displacing the solid-state imaging device 42 in the x and y directions to correct the translation drift between the images of the subject.

Since the control system is arranged as described above, not only drifts in the x and y directions between images of a subject formed on the imaging surface of the solid-state imaging device 42 but also a rotational drift between the images can be effectively corrected to enable high-resolution photography without so-called image shake.

In the above embodiment, the translation amount and the rotational moving amount of the entire image are calculated in accordance with drift detection results of the two, left and right areas L and R about the optical axis M in the imaging surface of the solid-state imaging device 42. The displacements in the x and y directions and the rotational displacement, however, can be calculated in accordance with only one arbitrary point of the image.

Figure 24:
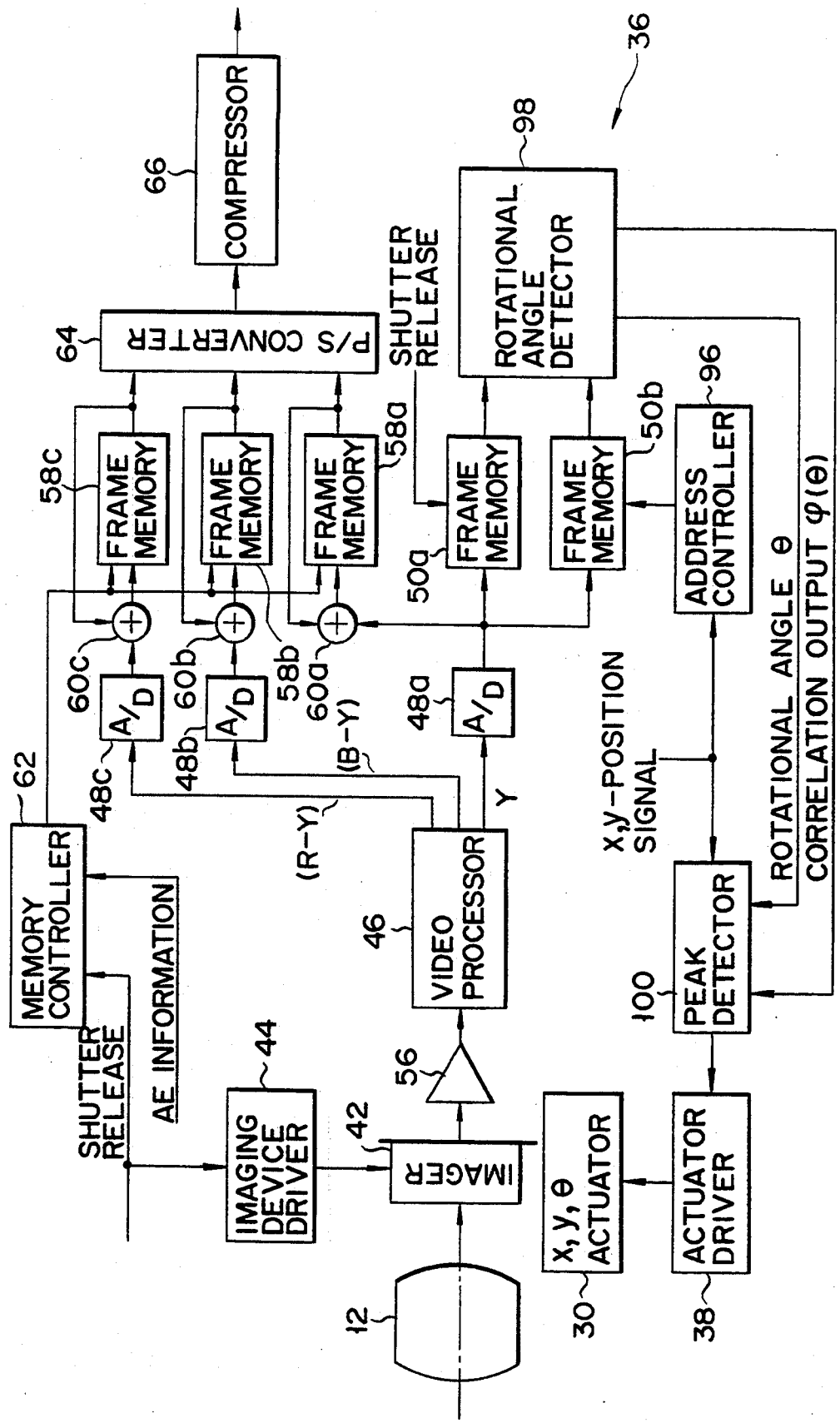
FIG. 24 is a block diagram showing an arrangement of an electronic camera as a camera apparatus according to the tenth embodiment of the present invention.

In this case, a control system is arranged, e.g., as shown in FIG. 24 (the tenth embodiment). That is, two frame memories 50a and 50b are arranged to store a luminance signal Y of a subject image signal input by a solid-state imaging device 42. The first frame memory 50a stores an image signal of the first frame, and the second frame memory 50b sequentially stores image signals from the second frame.

An image signal in an arbitrary position is read out from the second frame memory 50b under the control of an address controller 96, and a rotational angle detector 98 calculates a rotational angle $\theta$ for maximizing a correlation with respect to the image signal stored in the first frame memory 50a and a corresponding correlation value $\phi_{(\theta)}$. More specifically, the rotational angle detector 98 executes a correlation arithmetic operation between the image signal stored in the first frame memory 50a and an image signal in an arbitrary position (x, y) read out from the address-controlled second frame memory 50b, and a peak detector 100 monitors the rotational angle $\theta$ and the correlation value $\phi_{(\theta)}$ output from the rotational angle detector 98 to obtain the rotational angle $\theta$ as a rotational drift corresponding to the maximum correlation value $\phi_{(\theta)}$. At this time, the position (x, y) of the image signal read out from the second frame memory 50b is obtained as a translation amount in the x and y directions.

An actuator driver 38 is activated in accordance with the rotational drift $\theta$ and the drifts in the x and y directions calculated as described above to drive an xy$\theta$ actuator 30, thereby displacing the solid-state imaging device 42 to correct the drifts.

The rotational angle detection arithmetic operation executed by the rotational angle detector 98 will be briefly described below.

Assuming that an image stored in the first frame memory 50a is $f1_{(r1, \theta1)}$ and an image stored in the second frame memory 50b is $f2_{(r2, \theta2)}$, and that images obtained by integrating the above images in the radial direction are f1' and f2', these integrated images f1' and f2' are represented as follows:

$$f1'(\theta1) = \int_0^\infty f_{(r1, \theta1)} r1 dr1$$

$$f2'(\theta2) = \int_0^\infty f_{(r2, \theta2)} r2 dr2.$$

If the second image $f2_{(r2, \theta2)}$ is rotated by an angle $\theta_0$ with respect to the first image $f1_{(r1, \theta1)}$, an angle $\theta$ for maximizing a correlation output between the images represented by:

$$\phi(\theta) = f1'(\theta)*f2'(\theta)$$

is the angle $\theta_0$. The angle $\theta$ obtained when the correlation value between the images is maximized, therefore, indicates a rotational drift between the above two images. Note that this correlation arithmetic operation can be realized by a one-dimensional arithmetic operation and can be easily executed with a comparatively small amount of calculations.

In order to perform the drift detection as described above by using an exclusive imaging device for drift detection, a solid-state imaging device having a pixel arrangement (imaging array structure) capable of adding image signals in the radial direction as shown in FIG. 25 and outputting the sum signal may be used.

The above rotational angle detection can also be realized by applying two-dimensional Mellin transform as described in the following reference:

[Casasent D and D. Psaltis (1976), "Position, Rotation, and Scale Invariant Optical Correction", Appl. Opt. 15, 1705–1799].

Note that the present invention is not limited to the above embodiments. For example, a method of detecting a drift between images of a subject or a method of correcting the detected drift can be performed by arbitrarily combining the methods described in the above embodiments. In addition, when a photographic lens is to be detachably arranged, the function of displacing the photographic optical lens 12 can be incorporated in either the photographic lens or a lens mount portion or the like of a main body. Furthermore, the solid-state imaging device 42 for detecting a drift between images of a subject may be either incorporated in a photographic lens or fixed in a main body.

When the double housing structure shown in FIG. 17 or the like is to be adopted, a member to be mounted on the outer housing member such as a film wind mechanism is naturally connected to a member to be incorporated in the inner housing member 88 via a flexible member.

In addition, an electronically input subject image signal can be electronically subjected to drift correction.

Furthermore, a random-access imaging device can be used to selectively read out partial images in the areas L and R described above. When a nondestructive solid-state imaging device is used to accumulate imaging signals of its own, the above-mentioned accumulative addition processing for image signals executed by adders and frame memories need not be performed.

As described above, an effective camera shake preventing circuit can be realized by using a drift between images of a subject on the imaging surface detected by the drift detecting unit 36.

The detection result obtained by the drift detecting unit 36, however, can be used in various applications other than the above camera shake preventing circuit.

For example, as one photographic technique of a still picture, a technique of panning a camera to continuously image a subject and combining a plurality of still pictures to obtain a panorama photograph is available. In order to perform such panorama photography (so-called composite photography), a camera main body is generally mounted on a tripod to perform a shutter release operation while the direction of an imaging field of the camera is horizontally panned in units of predetermined angles, thereby sequentially recording images of a subject in the respective fields.

In this panorama photography, however, since the shutter release operation is generally performed by checking by eye monitoring whether the direction of the imaging field is panned by a predetermined angle, it is very difficult to perform correct photography. For this reason, an image of a subject is often disconnected or portions of the image often overlap each other between pictures of the respective fields.

In addition, even if a user tries to horizontally pan a camera main body to change the direction of a field of the camera, he or she cannot always correctly pan the camera in only the horizontal direction. If the horizontal panning is performed with a vertical displacement, a vertical drift is produced in an image between photographed pictures. Such an inconvenience is caused especially when a camera is not mounted on a tripod but held by the hands of a user in photography.

Such panorama photography, therefore, can be effectively performed by using an output from the drift detecting unit 36 as described above.

FIG. 26 shows an arrangement of an electronic still camera as a camera apparatus according to the eleventh embodiment of the present invention in which a drift detecting unit is used in panorama photography. Referring to FIG. 26, an imaging optical lens 12 is moved along its optical axis direction by a focusing mechanism (not shown) to perform focusing with respect to an image of a subject formed on the imaging surface of a solid-state imaging device 42.

A half mirror 20 arranged in an optical path between the imaging optical lens 12 and the solid-state imaging device 42 guides a portion of the subject image formed on the imaging surface of the solid-state imaging device 42 by the imaging optical lens 12 to a finder system (not shown).

The imaging optical lens 12 is supported by a camera main body so as to be displaced in the vertical direction (the y direction) of the imaging surface by a y-direction actuator 30y. The solid-state imaging device 42 is supported to be rotationally displaceable about its optical axis by a rotary actuator 30θ. The actuators 30y and 30θ are driven by actuator drivers 38y and 38θ to cause a vertical displacement of the imaging optical lens 12 and a rotational displacement of the solid-state imaging device 42, respectively. As a result, an optical positional relationship of an imaging optical system with respect to a subject is displaced to perform correction for a drift or a difference between images of the subject formed on the imaging surface of the solid-state imaging device 42 as will be described later.

The solid-state imaging device 42 inputs an image of a subject at a predetermined period such as a TV rate, and an imaging signal (subject image signal) is supplied to a video processor 46. The processor 46 performs emphasis correction or the like for the input subject image signal and separately outputs the corrected signal as a luminance signal component Y and two color difference signal components (R−Y) and (B−Y). The signal components Y, (B−Y), and (R−Y) separated by the video processor 46 are digital-coded by A/D converters 48a, 48b, and 48c, respectively, and converted into a single time-serial signal (digital image signal) by a P/S converter 64. This signal is subjected to predetermined data compression processing by a data compressor 66 and recorded in an image memory 102.

Note that the recording of a digital image signal into the image memory 102 is performed independently of the imaging of a subject image performed by the solid-state imaging device 42 in response to an imaging command generated upon a shutter release operation or an imaging command generated by an image position detector (to be described later). That is, only when an imaging command is supplied, the recording of a subject image signal of a certain scene currently supplied to the image memory 102 is performed.

In normal photography, each time a shutter release operation is performed in accordance with an image of a subject checked by the finder system, the obtained subject image signal is recorded in the image memory 102. In this case, images of a subject are recorded in the image memory 102 in an order of an imaging command given for the signal while the recorded images are managed in accordance with management information such as a frame number.

A characteristic feature of the apparatus of this embodiment is as follows. That is, when panorama photography is to be performed by horizontally panning the camera, in accordance with a panorama instruction generated in response to a switching operation of a photographic mode switch (not shown), a drift or a difference between images of a subject is detected by using a luminance signal component Y extracted by the video processor 46 from the subject image input at a predetermined period by the solid-state imaging device 42 as described above, and an image drift in the vertical direction (the y direction) of a picture and a rotational drift are corrected in accordance with the detected drift. If a predetermined amount of an image drift is detected in the horizontal direction (the x direction) of a picture, it is determined that the imaging optical system is panned by a predetermined angle, and the imaging command is automatically supplied to the image memory 102.

That is, when the panorama instruction is generated, a signal input switch 104 of a displacement detecting system is switched on to supply the luminance signal component Y of the subject image continuously input at a predetermined period to an area selector 106. The area selector 106 selects one of two partial areas A and B symmetrically disposed with respect to the optical axis M.

Two-dimensional correlation circuits 52a and 52b execute two-dimensional correlation arithmetic operations between the images of the partial areas A and B written in the frame memories 50a and 50b and a subject image signal input at a predetermined period thereafter, thereby obtaining displacement positions of the images in the areas A and B, respectively. The frame memories 50a and 50b are rewritten at a predetermined period to be used in a correlation arithmetic operation between the latest two frames.

That is, the two-dimensional correlation circuits 52a and 52b constantly execute the two-dimensional correlation arithmetic operations between latest continuous subject signals, i.e., a current subject signal and the subject signal of the immediately preceding frame stored in the frame memories 50a and 50b and detect drift between the image signals (frame images) as x and y displacements, respectively.

A rotational amount detector 78 calculates a rotational drift in accordance with x-displacement information of the subject image in the partial areas A and B respectively obtained by the two-dimensional correlation circuits 52a and 52b. A y-direction moving amount detector 108 calculates a drift in the y direction in accordance with y-displacement information of the subject image in the areas A and B and information of the rotational drift obtained by the rotational amount detector 78.

When an image position detector 110 determines in accordance with the x- and y-displacement information of the subject image in the areas A and B that the areas A″ and B″ move to A′ and B′ as shown in FIG. 27, it generates an imaging command, Recording of the next subject image signal is performed in accordance with the imaging signal.

The y-direction moving amount and the rotational drift calculated as described above are supplied to the actuator drivers 38y and 38θ, respectively. The actuator driver 38y drives the y-direction actuator 30y to displace the imaging optical lens 12 in a direction to correct the displacement in the y direction of the subject image. The actuator driver 38θ drives the actuator 30θ to rotationally displace the solid-state imaging device 42 in a direction to correct a rotational drift of the image.

Differences other than that in the panning direction between images of a subject formed on the imaging surface of the solid-state imaging device 42 are corrected by the rotational displacement and the y-direction displacement described above.

The above drift detection and drift correction will be described in more detail below.

Assuming that drifts in the partial area A are $dx_A$ and $dy_A$, drifts in the partial region B are $dx_B$ and $dy_B$, a vector of a drift between images of a subject in the area A indicated by the drifts $dx_A$ and $dy_A$ is $f_A$, and a vector of a drift between the subject images in the area B indicated by the drifts $dx_B$ and $dy_B$ is $f_B$, these drift vectors $f_A$ and $f_B$ are considered as a sum of rotational moving vector components $R_A$ and $R_B$ having an angle $\theta$ about the optical axis M and a translation vector component S, i.e., as vector sums $$f_A = R_A + S, \; f_B = R_B + S$$

as shown in FIG. 28. Note that the above rotational moving vector components $R_A$ and $R_B$ are generated due to, e.g., an inclination of the camera caused by the shutter release operation.

Since the drifts in the areas A and B calculated as described above are basically symmetrical with each other about the optical axis M, the following relation is established between the rotational vector components $R_A$ and $R_B$:

$$R_A + R_B = 0.$$

As a result, as is apparent from a schematic vector view in FIG. 28, a drift vector of the entire image of the subject can be obtained as follows:

translation amount;

$$S = (f_A + f_B)/2$$

rotational moving amount;

$$R_A = (f_A - f_B)/2.$$

Drifts in the x and y directions between the images of the subject, therefore, can be obtained by dividing the translation amount S in the x and y directions, and the obtained drifts can be corrected in the same manner as described above.

At the same time, correction for a rotational drift is performed in accordance with the rotational drift between the subject images. As a result, the drift correction for the subject image can be performed with higher precision.

That is, in this embodiment, a luminance component Y obtained by digital-converting a subject image signal repeatedly input by the solid-state imaging device 42 is supplied to the area selector 106 to extract subject image signals (partial image signals) of the areas A and B described above. The two-dimensional correlation circuits 52a and 52b respectively execute correlation arithmetic operations between image signals of two continuous frames in the areas A and B, thereby obtaining the drifts (vectors) $f_A(dx_A, dy_A)$ and $f_B(dx_B, dy_B)$ between the two continuous frames in the areas A and B.

The drifts $f_A(dx_A, dy_A)$ and $f_B(dx_B, dy_B)$ respectively calculated from the subject image signal in the areas A and B repeatedly obtained at a high speed as described above are input to the rotational amount detector 78 and the y-direction moving amount detector 108, thereby calculating a rotational drift and a translation drift.

More specifically, $$(dx_A - dx_B)/2, (dy_A - dy_B)/2$$

are calculated. Thereafter, the rotational amount detector 78 calculates a rotational drift $|RA|$ by executing the following arithmetic operation:

$$R_A = \sqrt{(dx_A - dx_B)^2 + (dy_A - dy_B)^2}.$$

In this case, since RA is a vector amount while the rotational drift is a scalar amount, $|R_A|$ is calculated. The actuator driver $38\theta$ is controlled in accordance with the rotational drift $|R_A|$ to drive the actuator $30\theta$, thereby rotationally displacing the solid-state imaging device 42 about the optical axis of the device to perform correction for the rotational drift.

In accordance with the above drifts, $$(dx_A + dx_B)/2, (dy_A + dy_B)/2$$

are calculated, thereby obtaining translation amount components in the x and y directions.

The actuator driver $38y$ is activated in accordance with the drift in the y direction described above to drive the actuator $30y$, thereby displacing the imaging optical lens 12 in the y direction to correct the translation drift in the y direction between the images of the subject.

Since the control system is arranged as described above, not only a drift in the direction but also a rotational drift between images of a subject formed on the imaging surface of the solid-state imaging device 42 can be effectively corrected to execute high-resolution photography without so-called image shake.

The image position detector 110 checks in accordance with an accumulated drift in the x direction calculated by the above drift detection whether an image of a subject formed by the solid-state imaging device 42 is displaced by a predetermined amount in the horizontal direction (the x direction). More specifically, the detector 110 checks whether images in the partial areas A" and B" shown in FIG. 27 move to the left ends A' and B' in the screen.

When the image position detector 110 detects that an image of a subject moves by a distance slightly shorter than the screen width, it generates an imaging command to the image memory 102. In response to this imaging command, the next subject image is written in the image memory 102. In synchronism with the write operation for the subject image into the image memory 102, image signals of the partial areas A and B of the subject image are written in the frame memories 50a and 50b. The above drift detection is performed on the basis of these images of the areas A and B written in the frame memories 50a and 50b.

As described above, according to the apparatus of this embodiment, an image of a subject input at a predetermined period by the solid-state imaging device 42 is recorded in the image memory 102 on the basis of a timing at which a panorama instruction is given to generate an imaging command, and a drift detection is performed between the subject images in accordance with a specific portion of the recorded images. If a drift is detected in a direction other than the panning direction, the imaging optical system is displaced in a direction to correct the drift to execute the drift correction. In addition, when a drift in the panning direction reaches a predetermined amount, it is determined that the camera is panned by the predetermined amount, and an imaging command is automatically generated.

As a result, when a user pans the camera while a panorama instruction is given, an image of a subject is automatically recorded in the image memory 102 each time a panning amount reaches a predetermined amount. In addition, while a vertical drift or a rotational drift between images caused by vertical shake of the camera during the panning operation is effectively corrected, a plurality of subject images to be combined as a panorama photograph can be automatically recorded.

Furthermore, since the image recording is executed when images in the partial areas A" and B" on the right side of the imaging screen move to the left areas A' and B', a portion corresponding to the image width the partial area is double-recorded. When a plurality of recorded images are to be combined to form a panorama photograph, therefore, a drift between the images can be easily corrected by using the above double-recorded image portion, and the combining processing can be effectively performed. For example, an image drift which cannot be corrected by the displacement control of the imaging optical system described above can be corrected by using the above double-recorded image portion to perform the combining processing.

Note that the present invention is not limited to the above embodiment. For example, when a rotational drift of the optical system is negligible, the rotational drift correction can be omitted. In addition, as a method of correcting an image drift, the solid-state imaging device 42 can be vertically displaced, or a rotational drift can be optically corrected by using a prism or the like.

In the panorama photography, a photographic focal length, an in-focus position, an exposure amount, and the like are preferably maintained constant. As a result, the precision of a correlation arithmetic operation with respect to an image can be easily increased.

Although the two partial areas are set to perform image drift detection in the above embodiment, only one partial area can be set. In the above embodiment, images of the partial areas are fetched in the frame memories, and drift detection is performed in accordance with the fetched partial images. The drift detection, however, can be performed on the basis of one image stored in an image memory by checking a portion of the image stored in the image memory to which an image portion of the partial area A of a sequentially input image corresponds by a two-dimensional correlation arithmetic operation.

Since the camera apparatus according to the present invention has the drift correction function as described above, a user can easily perform panorama photography by holding the camera. Especially when a user uses a tri-pod, panorama photography can be performed at a high speed since he or she need only pan the camera. Furthermore, the camera can be mounted on a moving body (an automobile or train) to panoramically image a moving subject through a window.

Additional advantages and modifications will readily occur to those skilled in the art. Therefore, the invention in its broader aspects is not limited to the specific details, and representative devices, shown and described herein. Accordingly, various modifications may be made without departing from the spirit or scope of the general inventive concept as defined by the appended claims and their equivalents.

What is claimed is:

1. A camera apparatus, comprising:
    a photometering system;
    a photographic optical means for forming a subject image of a subject on an image formation surface within a photographing period determined under control of said photometering system;
    imaging device means for electronically imaging at a high speed at least a portion of the subject image formed on said image formation surface;
    imaging device driving means for driving said imaging device means at said high speed to repeatedly perform electronic imaging of the subject image at least three times during said photographing period;
    memory means for storing image signals of a frame of the subject read out from said imaging device means and derived from the electronic imaging performed during said photographing period;
    detecting means for calculating a correlation between the image signals of the frame stored in said memory means and respective image signals of frames of said subject repeatedly read out at least two times at the high speed from said imaging device means and derived from the electronic imaging performed during said photographing period to successively detect at least two times a displacement between the subject images formed on said image formation surface; and
    displacement correcting means for successively displacing during said photographing period an optical positional relationship between said photographic optical means and said image formation surface with respect to the subject in accordance with the displacement detected by said detecting means, thereby correcting the displacement between the subject images formed on said image formation surface.

2. The camera apparatus according to claim 1, wherein
    said image formation surface includes a film exposure surface.

3. The camera apparatus according to claim 2, further comprising half mirror means, arranged between said photographic optical means and said film exposure surface, for splitting a portion of the subject image formed on said film exposure surface through said photographic optical means and guiding the portion to said imaging device means.

4. The camera apparatus according to claim 3, further comprising an elongating focal length optical system, arranged between said half mirror means and said imaging device means, for enlarging the portion of the subject image split by said half mirror means and guiding the portion enlarged by said elongating focal length optical system to said imaging device means.

5. The camera apparatus according to claim 2, wherein said imaging device means is arranged near said film exposure surface so as to image a portion of the subject image formed on said film exposure surface through said photographic optical means.

6. The camera apparatus according to claim 2, wherein said memory means stores image signals of the frame of said subject initially imaged by said imaging device means when the photographing period for the subject image is started; and
    wherein said detecting means includes two-dimensional correlating means for executing a two-dimensional correlation arithmetic operation between the image signals of the frame of said subject stored in said memory means and respective image signals of frames of said subject sequentially imaged during said photographing period of the subject image, thereby calculating displacements between the images of said subject formed on said film exposure surface in a first direction perpendicular to an optical axis of said photographic optical means and in a second direction perpendicular to both the optical axis of said photographic optical means and the first direction.

7. The camera apparatus according to claim 6, wherein said imaging device means is divided into first and second areas by the optical axis, said memory means includes first memory means for storing image signals of a frame of said subject initially imaged in said first area of said imaging device means when the photographing period for the subject image is started, and second memory means for storing image signals of a frame of said subject initially imaged in said second area of said imaging device means when the photographing period for the subject image is started, said two-dimensional correlating means includes a first two-dimensional correlating circuit for executing said two-dimensional correlation arithmetic operation between the image signals of the frame of said subject stored in said first memory means and respective image signals of frames of said subject sequentially imaged by said first area of said imaging device means during said photographing period of the subject image, thereby calculating a displacement in said first area, and a second two-dimensional correlating circuit for executing said two-dimensional correlation arithmetic operation between image signals of the frame of said subject stored in said second memory means and respective image signals of frames of said subject sequentially imaged by said second area of said imaging device means during said photographing period of the subject image, thereby calculating a displacement in said second area, and said detecting means further includes means for detecting a rotational amount and a parallel movement amount of the displacement in accordance with outputs from said first and second two-dimensional circuits.

8. The camera apparatus according to claim 7, wherein said displacement correcting means further includes means for rotating a Dove prism arranged between said photographic optical means and said film exposure surface.

9. The camera apparatus according to claim 2, wherein, said imaging device means includes a first imaging device for detecting a displacement in a first direction perpendicular to an optical axis of said photographic optical means, and a second imaging device for detecting a displacement in a second direction perpendicular to both the optical axis of said photographic optical means and the first direction, and said detection means includes:

first memory means for storing image signals of a frame of said subject initially imaged by said first imaging device when said photographing period for the subject image is started;

second memory means for storing image signals of a frame of said subject initially imaged by said second imaging device when said photographing period for the subject image is started;

first one-dimensional correlating means for executing a one-dimensional correlation arithmetic operation between the image signals of the frame of said subject stored in said first memory means and respective image signals of frames of said subject sequentially imaged by said first imaging device during said photographing period of the subject image, thereby calculating a displacement between the images of said subject formed on said film exposure surface in the first direction; and second one-dimensional correlating means for executing a one-dimensional correlation arithmetic operation between the image signals of the frame of said subject stored in said second memory means and respective image signals of frames of said particular subject sequentially imaged by said second imaging device during said photographing period of the subject image, thereby calculating a displacement between images of said subject formed on said film exposure surface in the second direction.

10. The camera apparatus according to claim 2, wherein said imaging device means is arranged in a position for imaging light of the subject image formed through said photographic optical means and reflected by said film exposure surface.

11. The camera apparatus according to claim 2, wherein said displacement correcting means includes an actuator mechanism movable relative to at least said film exposure surface in accordance with the displacement detected by said detecting means while being kept perpendicular to the optical axis of said film exposure surface.

12. The camera apparatus according to claim 2, wherein said displacement correcting means includes an actuator mechanism for rotationally displacing said film exposure surface in accordance with the drift detected by said detecting means.

13. The camera apparatus according to claim 1, further comprising:

video processor means for obtaining a luminance signal and two color difference signals from the subject image formed by said imaging device means; and a storage medium for electronically storing the luminance signal and the two color difference signals obtained by said video processor means, and wherein said imaging device means is arranged on said image formation surface, and said detecting means calculates a correlation between the luminance signals from said video processor means to detect a displacement between the subject images formed on an imaging surface of said imaging device means.

14. The camera apparatus according to claim 13, further comprising:

first, second and third A/D converters for digital-coding said luminance signal and the two color difference signals from said video processor means, said first A/D converter outputting a digital-coded luminance signal;

first, second and third memory means for storing outputs from said first, second and third A/D converters, respectively;

means for converting the digital codes stored in said first, second and third memory means into serial data and storing the serial data in said storage medium; and first, second and third adding means, respectively connected between said first, second and third A/D converters and said first, second and third memory means, for adding the digital codes supplied from said A/D converters to the digital codes in said memory means and storing the resultant digital codes in said memory means, respectively.

15. The camera apparatus according to claim 14, wherein said detecting means includes:
   fourth memory means for storing said digital-coded luminance signal obtained from a subject image initially imaged upon shutter release and supplied from said first A/D converter; and
   two-dimensional correlating means for executing a two-dimensional correlation arithmetic operation between the digital coded luminance signal stored in said fourth memory means and digital-coded luminance signals sequentially imaged by said imaging device means and obtained from said first A/D converter, thereby calculating a displacement between the subject images formed on said imaging surface of said imaging device means.

16. The camera apparatus according to claim 15, wherein
   said imaging device means is divided into first and second areas with an optical axis,
   said fourth memory means includes fifth memory means for storing a digital coded luminance signal obtained from a subject image signal initially imaged in said first area of said imaging device means, and sixth memory means for storing a digital-coded luminance signal obtained from a subject image signal initially imaged in said second area of said imaging device means,
   said two-dimensional correlating means includes a first two-dimensional correlating circuit for executing a two-dimensional correlation arithmetic operation between the luminance signal stored in said fifth memory means and digital coded luminance signals obtained from subject image signals sequentially imaged by said first area of said imaging device means, thereby calculating a displacement in said first area, and a second two-dimensional correlating circuit for executing a two-dimensional correlation arithmetic operation between the luminance signal stored in said sixth memory means and digital-coded luminance signals obtained from subject image signals sequentially imaged by said second area of said imaging device means, thereby calculating a displacement in said second area, and
   said detecting means further includes rotational amount detecting means for detecting a rotational amount and a parallel movement amount of a displacement in accordance with outputs from said first and second two-dimensional correlating circuits.

17. The camera apparatus according to claim 15, wherein
   said fourth memory means includes fifth memory means for storing a digital-coded luminance signal obtained from image signals of said particular subject initially imaged by said imaging device means, and sixth memory means for storing digital-coded luminance signals obtained from image signals of said particular subject subsequently imaged by said imaging device means, and
   said two-dimensional correlating means includes rotational amount detecting means for executing a correlation arithmetic operation between the luminance signal stored in said fifth memory means and the luminance signals stored in said sixth memory means, thereby detecting a rotational amount and a parallel movement amount of a displacement.

18. A camera apparatus, comprising:
   a photometering system;
   a photographic optical means for forming a subject image of a subject on an image formation surface within a photographing period determined under control of said photometering system;
   imaging device means, arranged on said image formation surface, for consecutively electronically imaging at least three times during said photographing period the subject image formed on said image formation surface;
   image memory means for successively fetching a first or prior subject image of two sequential subjects imaged by said imaging device means;
   displacement detecting means for successively calculating at least two times a correlation between the first or prior subject image stored in said image memory means and a second or posterior subject image imaged by said imaging device means, thereby detecting a displacement between the subject images formed on an imaging surface of said imaging device means; and
   imaging command generating means for generating an imaging command when a displacement in a predetermined direction and having a predetermined amount of the subject image imaged by said imaging device means is detected in accordance with the displacement between the subject images successively detected by said displacement detector means.

19. The camera according to claim 18, further comprising displacement correcting means for displacing an optical positional relationship between said photographic optical means and said imaging surface of said imaging device means with respect to a subject in accordance with components of a displacement other than the predetermined displacement calculated from the displacement detected by said displacement detecting means.

* * * * *